United States Patent
Nishi et al.

(10) Patent No.: US 8,018,203 B2
(45) Date of Patent: Sep. 13, 2011

(54) CONTROL SYSTEM OF SECONDARY BATTERY AND HYBRID VEHICLE EQUIPPED WITH THE SAME

(75) Inventors: Yuji Nishi, Nagoya (JP); Takeshi Takemoto, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 370 days.

(21) Appl. No.: 12/375,956

(22) PCT Filed: Aug. 20, 2007

(86) PCT No.: PCT/JP2007/066504
§ 371 (c)(1),
(2), (4) Date: Feb. 2, 2009

(87) PCT Pub. No.: WO2008/026525
PCT Pub. Date: Mar. 6, 2008

(65) Prior Publication Data
US 2010/0033132 A1   Feb. 11, 2010

(30) Foreign Application Priority Data
Aug. 31, 2006   (JP) .................................. 2006-235699

(51) Int. Cl.
*H02J 7/00* (2006.01)
(52) U.S. Cl. .......................... 320/136; 320/124; 320/134
(58) Field of Classification Search ........................ None
See application file for complete search history.

(56) References Cited

U.S. PATENT DOCUMENTS

| | | | |
|---|---|---|---|
| 5,633,577 A * | 5/1997 | Matsumae et al. | 322/37 |
| 6,262,577 B1 * | 7/2001 | Nakao et al. | 324/425 |
| 7,804,277 B2 * | 9/2010 | Sato | 320/132 |
| 2008/0053715 A1 * | 3/2008 | Suzuki et al. | 180/2.1 |
| 2009/0070052 A1 * | 3/2009 | Taniguchi et al. | 702/63 |

FOREIGN PATENT DOCUMENTS

| | | |
|---|---|---|
| JP | 11-204149 A | 7/1999 |
| JP | 2000-100479 A | 4/2000 |
| JP | 2000-268886 A | 9/2000 |
| JP | 2003-346919 A | 12/2003 |
| JP | 2006-42497 A | 2/2006 |

OTHER PUBLICATIONS

W.B. Gu and C.Y. Wang: *Thermal-Electrochemical Coupled Modeling of a Lithium-Ion Cell*, ECS Proceedings, 2000, vol. 99-25 *(1), Gate Center for Advanced Energy Storage, Department of Mechanical Engineering & Pennsylvania Transportation Institute, The Pennsylvania State University, University Park, PA 16802, USA.

* cited by examiner

*Primary Examiner* — Vinh P Nguyen
(74) *Attorney, Agent, or Firm* — Kenyon & Kenyon LLP

(57) ABSTRACT

A battery model unit includes an electrode reaction model unit based on the Butler_Volmer equation, an electrolyte lithium concentration distribution model unit analyzing a lithium ion concentration distribution in an electrolyte solution by a diffusion equation, an active material lithium concentration distribution model unit analyzing an ion concentration distribution in a solid state of an active material by a diffusion equation, a current/potential distribution model unit for obtaining a potential distribution according to the charge conservation law, a thermal diffusion model unit and a boundary condition setting unit. The boundary condition setting unit (66) sets a boundary condition at an electrode interface such that a reacting weight at the electrode interface is not determined by a difference in material concentration between positions but a deviation from an electrochemically balanced state causes a change with time in lithium concentration at the interface and thus a (time-based) drive power for material transportation. Thereby, an appropriate charge/discharge control can be performed based on the battery model having the appropriately set battery condition.

18 Claims, 19 Drawing Sheets

FIG.5

| | |
|---|---|
| $\phi_s$ | POTENTIAL IN SOLID STATE [V] |
| $\phi_e$ | POTENTIAL IN ELECTROLYTE [V] |
| $R_f$ | INTERFACE DC RESISTANCE (SEI FILM DC RESISTANCE) [Ω] |
| $c_s$ | Li CONCENTRATION IN ACTIVE MATERIAL [mol/cm$^2$] |
| $c_e$ | Li (ION) CONCENTRATION IN ELECTROLYTE [mol/cm$^2$] |
| $c_{se}$ | Li CONCENTRATION AT ACTIVE MATERIAL INTERFACE [mol/cm$^2$] |
| U | MONOPOLE OCV OF POSITIVE AND NEGATIVE ELECTRODES [V] |
| $U_0$ | POTENTIAL AT REFERENCE TEMPERATURE OF POSITIVE AND NEGATIVE ELECTRODES [V] |
| T | TEMPERATURE [K] |
| $T_0$ | REFERENCE TEMPERATURE [K] |
| $/i_{nj}$ | TRANSPORT CURRENT DENSITY [A/cm$^2$] |
| $/i_{0j}$ | EXCHANGE CURRENT DENSITY [A/cm$^2$] |
| $j^{Li}$ | REACTION CURRENT [A/cm$^3$], $\int j^{Li} \cdot dv = I$ |
| k | ION CONDUCTIVITY [S/cm] |
| $k^{eff}$ | EFFECTIVE ION CONDUCTIVITY |
| $k_D^{eff}$ | DIFFUSION CONDUCTION COEFFICIENT |
| $t_+^0$ | TRANSPORT NUMBER |
| $\sigma$ | SOLD PHASE ELECTRON CONDUCTANCE [S/cm] |
| $\gamma$ | DEGREE OF CURVATURE |
| $\varepsilon_e, \varepsilon_s$ | ELECTROLYTE VOLUME FUNCTION, ACTIVE MATERIAL VOLUME FUNCTION |
| $r_s$ | ELECTRODE ACTIVE MATERIAL RADIUS [cm] |
| $\rho$ | DENSITY [g/cm$^3$] |
| $c_p$ | THERMAL CAPACITY [J/kg·K] |
| R | GAS CONSTANT [J/mol·K] |
| F | FARADAY CONSTANT [C/mol] |
| $a_s$ | ACTIVE MATERIAL SURFACE AREA PER UNIT ELECTRODE VOLUME |
| $D_s$ | DIFFUSION COEFFICIENT (ACTIVE MATERIAL) |
| $D_e^{eff}$ | DIFFUSION COEFFICIENT (ELECTROLYTE) |
| $f_\pm$ | AVERAGE MOL ACTIVITY INDEX OF ELECTROLYTE |
| $\lambda$ | THERMAL CONDUCTIVITY [W/cm·K] |

CONTROL SYSTEM OF SECONDARY BATTERY AND HYBRID VEHICLE EQUIPPED WITH THE SAME

This is a 371 national phase application of PCT/JP2007/066504 filed 20 Aug. 2007, claiming priority to Japanese Patent Application No. 2006-235699 filed 31 Aug. 2006, the contents of which are incorporated herein by reference.

TECHNICAL FIELD

The invention relates to a control system of a secondary battery and a hybrid vehicle equipped with the control system, and particularly to charge/discharge control of a secondary battery using the battery model that allows dynamic estimation of an internal state of the battery.

BACKGROUND ART

Power supply systems having a chargeable and dischargeable secondary battery that can supply an electric power to a load device and also can be charged when needed. Typically, this kind of power supply systems are mounted on hybrid vehicles, electric vehicles and the like that use an electric motor driven by the secondary battery as a drive power source. For example, the electric vehicle uses the power stored in the secondary battery for driving the vehicle. The hybrid vehicle is driven by the electric power that is driven with the electric power stored in the secondary battery, and is also driven while assisting the engine by the electric motor. A fuel cell vehicle is driven by the electric motor that is driven with the electric power provided from a fuel cell, and is also driven with the electric power stored in the secondary battery in addition to the electric power of the fuel cell.

Particularly, in the hybrid vehicle of the type that generates an electric power by driving a power generator by an internal combustion engine mounted on the vehicle and can charge the secondary battery with the power thus generated, it is necessary to control a State Of Charge (SOC) of the secondary battery to attain substantially an intermediate state (50%-60%) between a fully charged state (100%) and a completely discharged state (0%) so that the secondary battery can receive a regenerative electric power and, when necessary, can immediately supply the electric power to the electric motor.

When the secondary battery is overcharged or overdischarged, this deteriorates a battery performance to reduce its life. Therefore, when the secondary battery is used while repeating the charge and discharge for attaining a control target, i.e., the intermediate SOC as described above, it is necessary to grasp successively the state of charge of the secondary battery and to perform the charge/discharge control for restricting the excessive charging and discharging.

Therefore, Japanese Patent Laying-Open Nos. 2003-346919, 2000-100479, 11-204149 and 2000-268886 (patent documents 1, 2, 3 and 4, respectively) have proposed control structures that grasp, from a macroscopic viewpoint, a battery state based on charge/discharge currents, an output voltage (terminal voltage), and further grasp the battery state based on dynamic estimation of an internal state of the secondary battery including various factors such as an ion concentration distribution in an active material forming the secondary battery. Particularly, in connection with a lithium ion battery, W. B. Gu and C. Y. Wang, "THERMAL-ELECTROCHEMICAL COUPLED MODELING OF A LITHIUM-ION CELL", ECS Proceedings Vol. 99-25 (1), pp. 743-762 (non-patent document 1) has disclosed a battery model equation that enables estimation of an electrochemical reaction inside the battery.

DISCLOSURE OF THE INVENTION

For dynamically estimating the internal state of the secondary battery described above, it is necessary to analyze an electrochemical reaction at an interface between an electrode (active material) and an ion conductor (typically, an electrolyte), and also it is necessary to perform analysis about a material (or ions) formed by this electrochemical reaction and specifically to analyze a material transportation (diffusion phenomenon) inside the electrode and the ion conductor.

In the foregoing patent documents 1-4 and the non-patent document 1, boundary conditions for the diffusion equation that is used for analyzing the material transportation in the above analysis are set such that a difference in concentration may cause the drive power of the material transportation, and more specifically such that a differentiation in a space direction of the concentration of the material (or ions) to be analyzed may be proportional to a reaction current caused by an electrode reaction at the interface.

According to the above boundary conditions, however, a reacting quantity at the interface depends on a temperature difference, and does not match with an actual battery behavior. Particularly, when the battery is sufficiently relaxed to eliminate a difference in concentration, a current does not flow in the battery model employing the above boundary conditions so that artificially processing must be performed on a calculation algorithm. Consequently, arbitrariness occurs in analysis of the internal state of the battery so that a problem may arise in analysis precision.

The invention has been made for overcoming the above problem, and an object of the invention is to provide a control system of a secondary battery that can execute appropriate charge/discharge control based on a battery model in which a boundary condition is appropriately set, as well as a hybrid vehicle equipped with it.

A control system of a secondary battery is capable of supplying and receiving an electric power to/from a load, and includes a battery state estimating unit, a battery information generating unit and a load control unit. The secondary battery includes first and second electrodes including an active material having a predetermined material present in a solid state, and an ion conductor arranged between the first and second electrodes. The ion conductor transmits the ionized active material between the electrodes. The battery state estimating unit successively calculates a state estimation value indicating a battery state according to a battery model allowing dynamic estimation of the internal state of the secondary battery based on a value sensed by a sensor arranged at the secondary battery. The battery information generating unit produces battery information for restricting charge/discharge of the secondary battery based on the state estimation value calculated by the battery state estimating unit. The load control unit produces an operation command for the load to avoid overcharge and overdischarge of the secondary battery in view of the battery information produced by the battery information generating unit based on an operation request to the load. The battery state estimating unit includes first to fourth model units, and a boundary condition setting unit. The first model unit estimates an electrochemical reaction of the predetermined material at an interface between the active material and the ion conductor in each of the electrodes. The second model unit estimates a concentration distribution of the predetermined material in each of the electrodes based on a diffusion equation. The third model unit estimates an ion concentration distribution of the predetermined material in the ion conductor based on a diffusion equation. The fourth model unit estimates a potential distribution according to a current distribution caused in each of the electrodes and the ion conductor by a reaction current according to the electrochemical reaction. The boundary condition setting unit sets a boundary condition at the interface of the diffusion equation used in the second model unit based on a predetermined relational expression between a time differentiation of a concentration of the predetermined material and the reaction current.

Preferably, the predetermined relational expression is expressed by the following equation:

$$\frac{\delta(\varepsilon_s c_s)}{\delta t} = -\frac{j^{Li}}{a_s F} \quad (r = r_s)$$

wherein "$c_s$" indicates a concentration of the predetermined material at each of points in the active material represented by a spherical model determined by assuming that the concentration of the predetermined material is uniform in a circumferential direction, r indicates a distance to each of the points from a center, $r_S$ indicates a radius of the active material, $\varepsilon_s$ indicates a volume fraction of the active material, t indicates a time, $j^{Li}$ indicates the reaction current, $a_s$ indicates a surface area of the active material and F indicates a Faraday constant.

According to the above control system of the secondary battery, the boundary condition at the electrode interface can be quantized such that a (time-based) drive power for material transportation is caused not by a difference in material concentration between positions (spatial locations) but by a deviation from an electrochemically balanced state. Therefore, even when the charge/discharge current occurs in the state where the battery is sufficiently relaxed to eliminate a difference in concentration, the internal state of the battery can be estimated without performing artificial processing. Consequently, the internal state of the secondary battery can be estimated according to the battery model with improved precision, and the appropriate charge/discharge control can be executed with the state estimation value that is a calculation result of the battery model.

Preferably, the battery information includes an upper limit power being inputtable and outputtable from the secondary battery. The battery information generating unit sets the upper limit power based on a distribution of the state estimation values at respective portions in the secondary battery. The load control unit produces the operation command for the load within a range equal to or lower than the upper limit power set by the battery information generating unit.

The above structure can estimate, according to the battery model, the internal reaction of the secondary battery, i.e., a distribution of degrees of use of the active material and a temperature distribution at respective portions inside the secondary battery, and thereby to set the inputtable/outputtable power of the secondary battery. Accordingly, the charge/discharge of the secondary battery can be appropriately restricted to avoid a phenomenon that may cause local deterioration of the battery.

Preferably, the control system of the secondary battery further includes a parameter identification model unit and a parameter managing unit. The parameter identification model unit identifies a parameter used in the battery model based on a sensed value sensed by the sensor. The parameter managing unit updates a parameter value used in the battery model of the parameter identified by the parameter identification model unit to change to a value identified by the parameter identification model unit when a difference larger than a predetermined value is present between the sensed value sensed by the sensor and representing an actual behavior of the secondary battery and a predicted value of the behavior based on a predicted value provided by the battery state estimating unit.

According to the above structure, the parameters of the battery model can be successively updated when a large difference occurs between the actual behavior of the secondary battery and the battery model. Thereby, the internal state of the battery can be grasped accurately so that the battery performance at that point in time can be utilized to the maximum extent. Also, it is possible to achieve the charge/discharge restriction that prevents reliably the local deterioration and thermal runaway.

Further preferably, when the parameter value is to be updated, the parameter managing unit estimates deterioration of the secondary battery by comparing the parameter value to be updated with characteristics of deterioration of the parameter value due to use of the secondary battery.

This structure can determine a remaining life of the secondary battery when the parameter is updated, and can provide a notification to a user. This achieves effective use of the secondary battery and can improve user's convenience.

Preferably, the battery information generating unit predicts, as the battery information, an input/output allowed time for which the secondary battery can continuously input/output a predetermined power from a present time, based on the state estimation value at the present time estimated by the battery state estimating unit. The load control unit produces an operation command for the load to avoid overcharge and overdischarge of the secondary battery in view of the input/output-allowed time predicted as the battery information.

This structure can predict the input/output-allowed time for which the charge/discharge can be continuously executed with the predetermined power from the present time, using the present state value calculated according to the motor module. Consequently, based on the internal state of the secondary battery at the present time, the characteristics of the input/output time with respect to the input/output power can be obtained. Accordingly, based on these characteristics, it is possible to perform the charge/discharge control in which the charge/discharge restriction is set in a stepwise fashion to exhibit the maximum battery performance while avoiding the overcharge and overdischarge.

Further preferably, the battery information generating unit predicts, as the battery information, a deterioration rate of the secondary battery attained in the case where the secondary battery continuously inputs/outputs a predetermined power from a present time, based on the state estimation value at the present time estimated by the battery state estimating unit. The load control unit produces an operation command for the load in view of the deterioration rate predicted as the battery information.

The above structure can predict the deterioration rate attained when the predetermined power is continuously charged/discharged, using the present estimated state value calculated according to the battery model. Therefore, the charge/discharge restriction of the secondary battery can be performed by appropriately reflecting the internal state of the secondary battery at each point in time, while giving consideration for preventing rapid deterioration due to the overcharge or overdischarge of the secondary battery.

Preferably, the control system of the secondary battery further includes a deterioration degree estimating unit. The deterioration degree estimating unit estimates a deterioration degree or a remaining life of the secondary battery based on a sensed value of the sensor. The load control unit produces the operation command for the load by obtaining an allowed deterioration rate range at a present time and restricting a charge/discharge power range of the secondary battery such that the deterioration rate predicted as the battery information falls within the allowed deterioration rate range, in view of the deterioration rate or the remaining life estimated by the deterioration degree estimating unit.

The above structure can change the range of allowed deterioration rate based on the present deterioration rate or the present remaining life of the secondary battery. Therefore, the charge/discharge of the secondary battery can be restricted while giving consideration for preventing reduction of the battery life due to rapid deterioration, reflecting the deterioration rate of the secondary battery at the present time.

Preferably, in the control system of the secondary battery according to the invention, the secondary battery is formed of a lithium ion battery, and the predetermined material is lithium.

In the above structure, the control target is the lithium ion battery having output characteristics that depends on a lithium concentration distribution state inside the electrode. Therefore, the charge/discharge control according to the invention, i.e., the charge/discharge control performed based on the estimation of the internal reaction of the battery according to the battery model can effectively achieve the effects that the overcharge and overdischarge can be avoided, and the battery performance can be exhibited to the maximum extent.

A hybrid vehicle according to the invention includes an internal combustion engine and an electric motor configured to generate a drive power of the vehicle; a control device determining drive powers to be output from the internal combustion engine and the electric motor, respectively, to ensure a required overall drive power of the vehicle; a secondary battery being capable of supplying and receiving the electric power to and from the electric motor; and a charge/discharge control device of the secondary battery. The secondary battery includes first and second electrodes including an active material having a predetermined material present in a solid state, and an ion conductor arranged between the first and second electrodes for transmitting the ionized active material between the electrodes. The charge/discharge control device includes a battery state estimating unit and a battery information generating unit. The battery state estimating unit successively calculates a state estimation value indicating a battery state according to a battery model allowing dynamic estimation of the internal state of the secondary battery based on a value sensed by a sensor arranged at the secondary battery. The battery information generating unit produces battery information for restricting charge/discharge of the secondary battery based on the state estimation value calculated by the battery state estimating unit. The battery state estimating unit includes first to fourth model units, and a boundary condition setting unit. The first model unit estimates an electrochemical reaction of the predetermined material at an interface between the active material and the ion conductor in each of the electrodes. The second model unit estimates a concentration distribution of the predetermined material in each of the electrodes based on a diffusion equation. The third model unit estimates an ion concentration distribution of the predetermined material in the ion conductor based on a diffusion equation. The fourth model unit estimates a potential distribution according to a current distribution caused in each of the electrodes and the ion conductor by a reaction current according to the electrochemical reaction. The boundary condition setting unit sets a boundary condition at the interface of the diffusion equation used in the second model unit based on a predetermined relational expressions between a time differentiation of a concentration of the predetermined material and the reaction current.

Preferably, the predetermined relational expression is expressed by the following equation:

$$\frac{\delta(\varepsilon_s c_s)}{\delta t} = -\frac{j^{Li}}{a_s F} \quad (r = r_s)$$

wherein "$c_s$" indicates a concentration of the predetermined material at each of points in the active material represented by a spherical model determined by assuming that the concentration of the predetermined material is uniform in a circumferential direction, r indicates a distance to each of the points from a center, $r_s$ indicates a radius of the active material, $\varepsilon_s$ indicates a volume fraction of the active material, t indicates a time, $j^{Li}$ indicates the reaction current, $a_s$ indicates a surface area of the active material and F indicates a Faraday constant.

In the hybrid vehicle, the battery information preferably includes an upper limit power being inputtable and outputtable from the secondary battery. The battery information generating unit sets the upper limit power based on a distribution of the state estimation values at respective portions in the secondary battery. The control device produces a torque command value for the electric motor within a range equal to or lower than the upper limit power set by the battery information generating unit.

Preferably, the charge/discharge control device in the hybrid vehicle further includes a parameter identification model unit and a parameter managing unit. The parameter identification model unit identifies a parameter used in the battery model based on a sensed value sensed by the sensor. The parameter managing unit updates a parameter value used in the battery model of the parameter identified by the parameter identification model unit to a value identified by the parameter identification model unit when a difference larger than a predetermined value is present between the sensed value sensed by the sensor and representing an actual behavior of the secondary battery and a predicted value of the behavior based on a predicted value provided by the battery state estimating unit.

Further preferably, when the parameter value is to be updated, the parameter managing unit in the hybrid vehicle estimates deterioration of the secondary battery by comparing the parameter value to be updated with characteristics of deterioration of the parameter value due to use of the secondary battery.

Preferably, the battery information generating unit in the hybrid vehicle predicts, as the battery information, an input/output allowed time for which the secondary battery can continuously input/output a predetermined power from a present time, based on the state estimation value at the present time estimated by the battery state estimating unit. The control device produces a torque command value for the electric motor to avoid overcharge and overdischarge of the secondary battery in view of the input/output-allowed time predicted as the battery information.

Further preferably, the battery information generating unit in the hybrid vehicle predicts, as the battery information, a deterioration rate of the secondary battery attained in the case where the secondary battery continuously inputs/outputs a predetermined power from a present time, based on the state estimation value at the present time estimated by the battery state estimating unit. The control device produces a torque command value for the electric motor in view of the deterioration rate predicted as the battery information.

Preferably, the charge/discharge control device in the hybrid vehicle further includes a deterioration degree estimating unit estimating a deterioration degree or a remaining life of the secondary battery based on a sensed value of the sensor. The control device produces the torque command value for the electric motor by obtaining an allowed deterioration rate range at a present time and restricting a charge/discharge power range of the secondary battery such that the deterioration rate predicted as the battery information falls within the allowed deterioration rate range, in view of the deterioration rate or the remaining life estimated by the deterioration degree estimating unit.

Preferably, in the hybrid vehicle, the secondary battery is formed of a lithium ion battery, and the predetermined material is lithium.

According to the above hybrid vehicle equipped with the charge/discharge system of the secondary battery, the overall drive force required in the vehicle can be ensured while restricting the charge/discharge of the secondary battery of which load is formed of the electric motor, and giving consideration for preventing the overcharge and overdischarge as well as the rapid deterioration in the secondary battery.

The invention can provide the control system of the secondary battery that can execute the appropriate charge/discharge control based on the battery model, by appropriately setting the boundary condition of the battery model equation enabling dynamic estimation of the internal state of the secondary battery. Also, the invention can provide the hybrid vehicle equipped with the above control system.

BRIEF DESCRIPTION OF THE DRAWINGS

FIG. 5 shows, in a list form, variables and constants used in battery model equations forming the battery model unit.

BEST MODES FOR CARRYING OUT THE INVENTION

Embodiments of the invention will now be described with reference to the drawings. In the following description, the same or corresponding portions bear the same reference numbers, and description thereof is not repeated in principle.

First Embodiment

Figure 1:
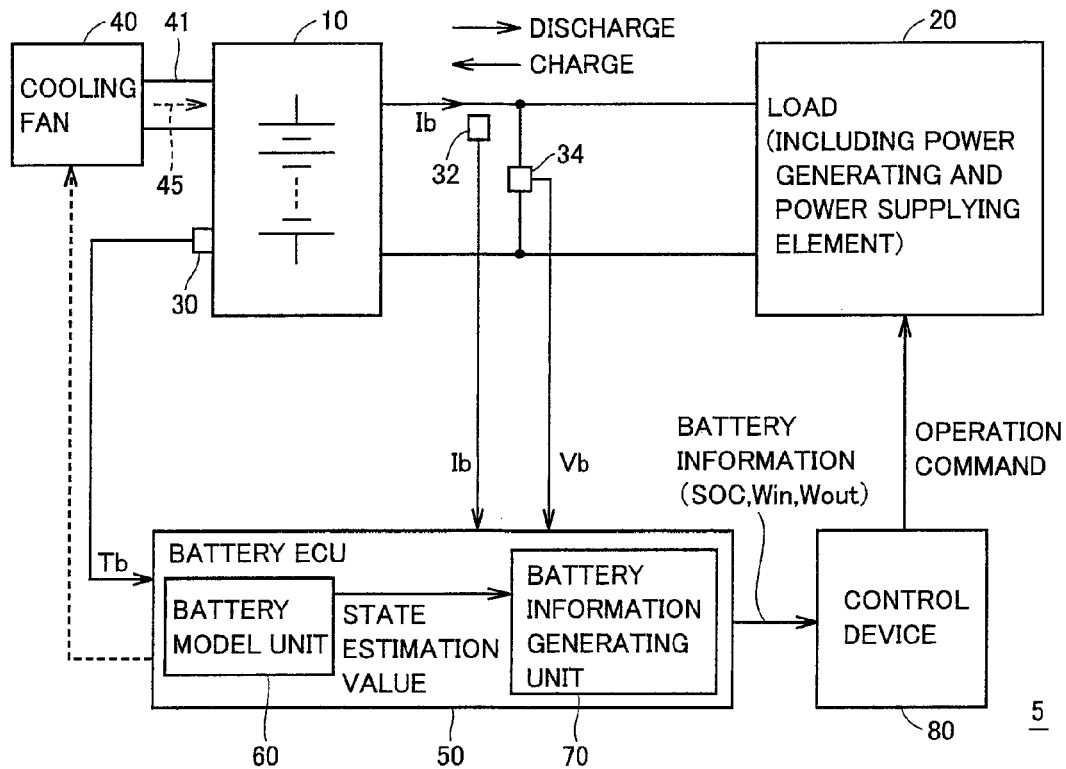
FIG. 1 is a schematic block diagram illustrating a structure of a power supply system controlled by a control system of a secondary battery according to an embodiment of the invention.

FIG. 1 is a schematic block diagram illustrating a structure of a power supply system controlled by a control system of a secondary battery according to an embodiment of the invention.

Referring to FIG. 1, a power supply system 5 includes a secondary battery 10, a load 20 and a cooling fan 40 of the secondary battery as well as a battery ECU (Electronic Control Unit) 50 and a control device 80 which are formed of ECUs. Each ECU is typically formed of a microcomputer for executing predetermined sequences and predetermined arithmetic operations that are programmed in advance as well as a memory such as a RAM (Random Access Memory), a ROM (Read Only Memory) or the like. Battery ECU 50 and control device 80 implements a "control system" that executes charge/discharge restrictions to be described below.

Chargeable and dischargeable secondary battery 10 is typically formed of a lithium ion battery. The lithium ion battery has output characteristics that vary depending on a distribution state of lithium concentration inside the battery and particularly an electrode, and therefore is suitable for employment in the invention.

Secondary battery 10 is provided with a temperature sensor 30 measuring a battery temperature Tb, a current sensor 32 measuring an input/output current Ib (which may also be referred to as a "battery current Ib" hereinafter) of secondary battery 10 and a voltage sensor 34 measuring a terminal voltage Vb (which may also be referred to as a "battery output voltage Vb" hereinafter) between a positive electrode and a negative electrode.

Cooling fan 40 is connected to secondary battery 10 via a coolant passage 41, and supplies "coolant", i.e., cooling air 45 into coolant passage 41. Although not shown, secondary battery 10 is provided at appropriate positions with coolant paths for cooling each cell of secondary battery 10 by cooling air 45 supplied through coolant passage 41. Battery ECU 50 controls on/off of cooling fan 40 and a coolant supply rate during the operation thereof.

Load 20 is driven by an output power provided from secondary battery 10. A power generating and supplying element (not shown) is included in load 20 or is arranged independently of load 20 so that secondary battery 10 can be charged with a charge current supplied from this power generating and supplying element. Therefore, battery current Ib is larger than zero (Ib>0) during discharging of secondary battery 10, and is smaller than zero (Ib<0) during charging of secondary battery 10.

Battery ECU 50 includes a battery model unit 60 and a battery information generating unit 70. Each of battery model unit 60 and battery information generating unit 70 corresponds, e.g., to a function block that is implemented by executing a predetermined program by battery ECU 50. Battery model unit 60 successively calculates a state estimation value representing a battery state at predetermined cycles according to a battery model that enables dynamic estimation of the internal state of secondary battery 10, based on sensed values provided from sensors 30, 32, 34 arranged at secondary battery 10.

Battery information generating unit 70 produces battery information for restricting the charging and discharging of the secondary battery, based on the state estimation value calculated by battery model unit 60. Typically, the battery information includes an SOC (0%-100%) indicating the charge quantity (residual capacity) with respect to the fully charged state (100%) as well as an inputtable power Win that is the upper limit of the chargeable power that is currently allowed, and an outputtable power Wout that is the upper limit of the dischargeable power.

Control device 80 produces, based on the operation request to load 20, an operation command for load 20 while restricting the charging and discharging to prevent the overcharge and overdischarge of secondary battery 10, in view of the battery information provided from battery ECU 50. For example, control device 80 restricts the input and output powers of secondary battery 10 to or below inputtable and outputtable powers Win and Wout, respectively. When the SOC of secondary battery 10 becomes lower than the lower limit, control device 80 inhibits the power consuming operation of load 20, or forcedly starts the power generating operation (charging operation of secondary battery 10) of load 20. Conversely, when the SOC of secondary battery 10 is higher than the upper limit, it forcedly inhibits the power generating operation of load 20.

The structure and the model of the secondary battery will be described in detail. Secondary battery 10 shown in FIG. 1 is formed of a cell assembly having a plurality of battery cells 10# connected together.

Figure 2:
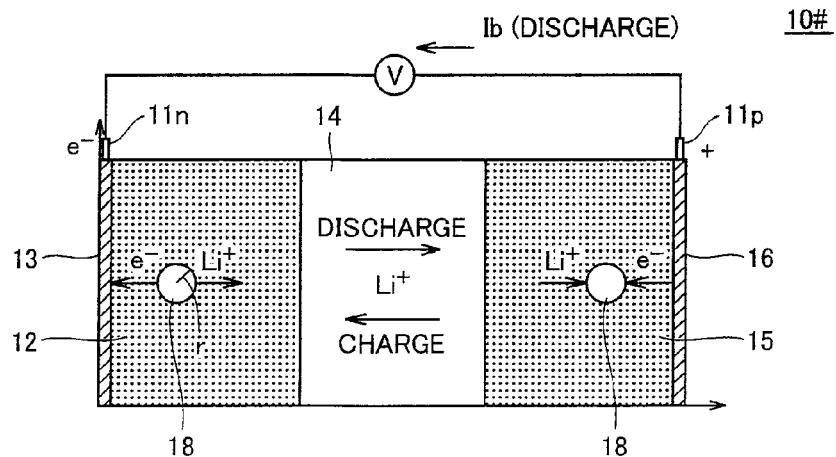
FIG. 2 shows a schematic structure of the secondary battery.

Referring to FIG. 2, each battery cell 10# forming secondary battery 10 includes a negative electrode 12, a separator 14 and a positive electrode 15. Separator 14 is made of resin immersed with a liquid electrolyte and arranged between negative electrode 12 and positive electrode 15.

Each of negative electrode 12 and positive electrode 15 is formed of a collection of spherical active materials 18. At an interface of negative electrode 12 with respect to active materials 18, a chemical reaction occurs to emit lithium ions $Li^+$ and electrons $e^-$ At an interface of positive electrode 15 with respect to active materials 18, a chemical reaction occurs to absorb lithium ions $Li^+$ and electrons $e^-$.

Negative electrode 12 is provided with a current collector 13 absorbing electrons $e^-$, and positive electrode 15 is provided with a current collector 16 emitting electrons $e^-$. Current collector 13 of the negative electrode is typically made of copper, and current collector 16 of the positive electrode is typically made of aluminum. Current collector 13 is provided with a negative terminal 11n, and current collector 16 is provided with a positive terminal 11p. By transporting lithium ions $Li^+$ through separator 14, battery cell 10# is charged or discharged to produce charge current Ib (>0) or discharge current Ib (<0).

Figure 3:
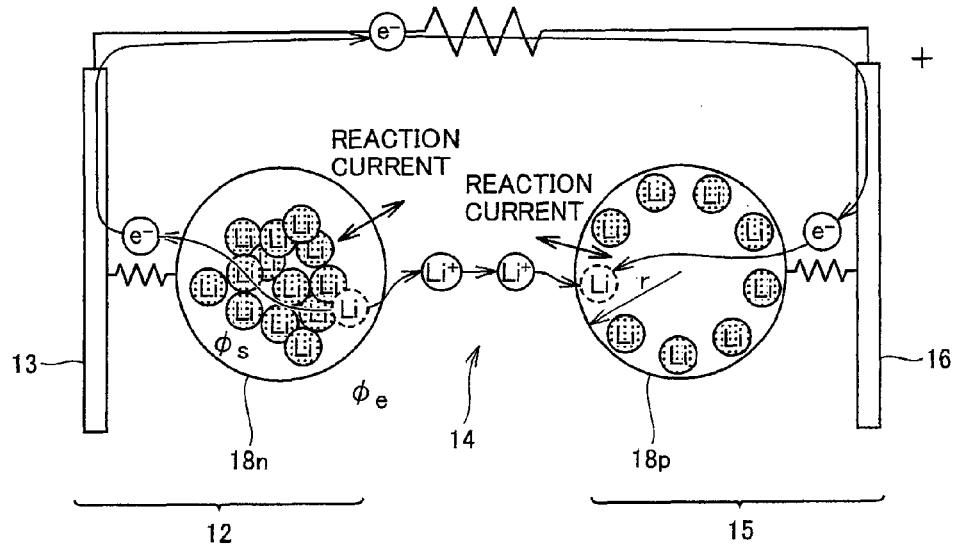
FIG. 3 is a conceptual diagram illustrating modeling of the secondary battery in a battery model unit.

FIG. 3 is a conceptual diagram illustrating modeling of the secondary battery in battery model unit 60.

Referring to FIG. 3, it is assumed in the battery model equation that active materials 18 in each of negative electrode 12 and positive electrode 15 in each battery cell 10# behave in the same manner, and one active material 18n or 18p will be representatively discussed in connection with each of negative electrode 12 and positive electrode 15. Alternatively, the following manner may be employed. In each of negative electrode 12 and positive electrode 15 shown in FIG. 2, behaviors of the plurality of active materials 18n are analyzed independently of those of the plurality of active materials 18p, and thereby a positional (spatial) distribution of the state estimation values in each electrode may be obtained.

In the discharge operation, an electrode reaction at the surface of active material 18n in negative electrode changes emission of electrons e⁻ from lithium atoms Li in active material 18n so that lithium ions Li⁺ are produced and are emitted into the electrolyte in separator 14. Also, an electrode reaction at the surface of active material 18p in positive electrode takes in lithium ions Li⁺ from the electrolyte so that electrons e⁻ are absorbed. Thereby, active material 18p in positive electrode takes in lithium atoms Li. The current flows from positive current collector 16 to negative current collector 13 owing to the emission of lithium ions Li⁺ from active material 18n in negative electrode and take-in of lithium ions Li⁺ by active material 18p in positive electrode.

Conversely, in the charging operation of the secondary battery, the electrode reaction at the surface of active material 18n in negative electrode takes in lithium ions Li⁺ from the electrolyte, and the electrode reaction at the surface of active material 18p in positive electrode emits lithium ions Li⁺ into the electrolyte.

In the battery model equation, modeling is performed on the electrode reactions at the surfaces of active materials 18p and 18n in the charging and discharging operations, radial diffusion of the lithium inside active materials 18p and 18n and diffusion of the lithium ions in the electrolyte (which will be collectively referred to as "diffusion and concentration distribution of the lithium" hereinafter) as well as a potential distribution and a temperature distribution at various portions.

Referring to FIGS. 4 to 7, battery model unit 60 will now be described in detail.

Figure 4:
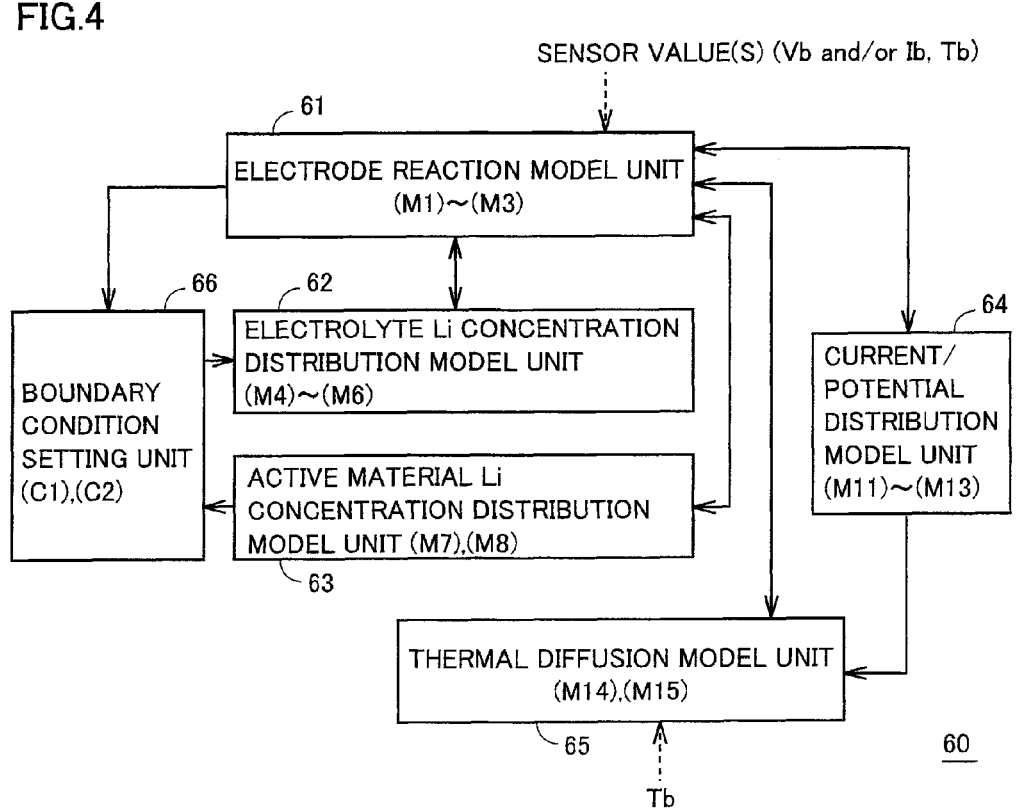
FIG. 4 is a block diagram illustrating a schematic structure of the battery model unit.

Battery model unit 60 is formed of the following battery model equations (M1)-(M15), and functional structures thereof are shown by a block diagram of FIG. 4. FIG. 5 shows, in a list form, variables and constants used in battery model equations (M1)-(M15). A battery temperature T (inside the battery), respective potentials and variables such as a lithium concentration shown in FIG. 5 correspond to "state estimation values" in the invention.

Referring to FIG. 4, battery model unit 60 includes an electrode reaction model unit 61, an electrolyte lithium concentration distribution model unit 62, an active material lithium concentration distribution model unit 63, a current/potential distribution model unit 64, a thermal diffusion model unit 65 and a boundary condition setting unit 66.

Electrode reaction model unit 61 is formed of the following equations (M1)-(M3):

$$/i_n = i_o \left[ \exp\left(\frac{\alpha_j F}{RT}\eta\right) - \exp\left(\frac{\alpha_c F}{RT}\eta\right) \right] \quad (M1)$$

$$\eta = \phi_s - \phi_e - U - /i_n R_f \quad (M2)$$

$$U = U_0 + (T - T_0)\frac{\delta U}{\delta T} \quad (M3)$$

Equations (M1)-(M3) are called "Butler-Volmer equations", and represent electrode reactions. In equation (M1), an exchange current density $i_O$ is given by a function of the lithium concentration at the interface of active material 18 (see the non-patent document 1 for details). Equation (M2) represents details of η in equation (M1), and equation (M3) represents details of U in equation (M2).

Electrolyte lithium concentration distribution model unit 62 is formed of the following equations (M4)-(M6).

$$\frac{\delta(\varepsilon_e c_e)}{\delta t} = \nabla(D_e^{eff}\nabla c_e) + \frac{1-t_+^0}{F}j^{Li} - \frac{\vec{i}_e \nabla t_+^0}{F} \quad (M4)$$

$$D_e^{eff} = \frac{D_e \varepsilon_e}{\tau} \quad (M5)$$

$$j^{Li} = a_s \cdot /i_n \quad (M6)$$

Equations (M4)-(M6) represent the law of lithium ion conservation in the electrolyte. Equation (M5) represents a definition of an effective diffusion coefficient in the electrolyte, and equation (M6) represents that a reaction current $j^{Li}$ is given by a product of an active material surface area as per unit volume of the electrode and a transport current density $/i_{nj}$ represented by equation (M1). The volume integral of reaction current $j^{Li}$ in the whole electrode corresponds to battery current Ib.

active material lithium concentration distribution model unit 63 is formed of the following equations (M7) and (M8).

Figure 6:
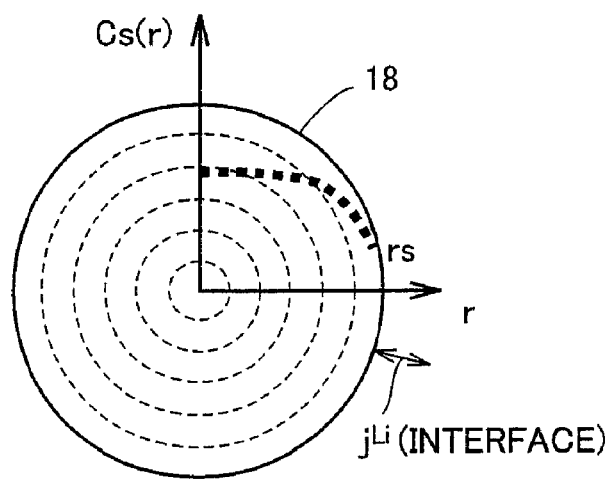
FIG. 6 is a conceptual diagram illustrating a lithium concentration analysis model of spherical active materials.

As shown in FIG. 6, assuming that lithium concentration $c_s$ is uniform in the circumferential direction, the lithium concentration in each of active materials 18p and 18n can be represented as a function on a radial coordinate r (where r is a distance of each point from a center, and $r_S$ is a radius of the active material).

$$\frac{\delta(\varepsilon_s c_s)}{\delta t} = \nabla D_s \nabla c_s \simeq D_s\left[\frac{\delta^2 c_s}{\delta r^2} + \frac{2}{r}\frac{\delta c_s}{\delta r}\right] \quad (M7)$$

$$a_s = \frac{3\varepsilon_s}{r_s} \quad (M8)$$

Equations (M7) and (M8) represent the law of lithium conservation in a solid state. Equation (M7) represents a diffusion equation (a diffusion coefficient $D_s$) in spherical active material 18, and equation (M8) represents active material surface area $a_s$ per unit electrode volume.

Current/potential distribution model unit 64 is formed of the following equations (M9)-(M13).

$$\nabla(\kappa^{eff}\nabla\phi_e) + \nabla(\kappa_D^{eff}\nabla \ln c_e) + j^{Li} = 0 \quad (M9)$$

$$\kappa^{eff} = \frac{\kappa}{\tau} \quad (M10)$$

$$\kappa_D^{eff} = \frac{2RT\kappa^{eff}}{F}(t_+^0 - 1)\left(1 + \frac{d\ln f_\pm}{d\ln c_e}\right) \quad (M11)$$

Equations (M9)-(M11) give the equation representing the potential in the electrolytes, according to the law of the charge concentration in the electrolyte.

Equation (M10) represents an effective ion conductivity $\kappa^{eff}$, and equation M(11) represents a diffusion conduction coefficient $\kappa_D^{eff}$ in the electrolyte.

$$\nabla(\sigma^{eff}\nabla\phi_s) - j^{Li} = 0 \quad (M12)$$

$$\sigma^{eff} = \varepsilon_s \sigma \quad (M13)$$

Equations (M12) and (M13) are equations for obtaining the potential in the solid state according to the law of charge conservation in the active material.

Thermal diffusion model unit 65 is formed of the following equations (M14) and (M15).

$$\frac{\delta(\rho c_p T)}{\delta t} = \nabla \lambda \nabla T + q \quad \text{(M14)}$$

$$q = a_s / i_n \left( \begin{array}{c} \phi_s - \phi_e - \\ U + T\frac{\delta U}{\delta T} \end{array} \right) + \sigma^{\text{eff}} \nabla \phi_s \nabla \phi_s + \left( \begin{array}{c} \kappa^{\text{eff}} \nabla \phi_e \nabla \phi_e + \\ \kappa_D^{\text{eff}} \nabla \ln c_e \nabla \phi_e \end{array} \right) \quad \text{(M15)}$$

Equations (M14) and (M15) represent the thermal energy conservation law. Thereby, it is possible to analyze local changes in temperature caused inside the secondary battery by the charge/discharge phenomenon.

Since these battery model equations (M1)-(M15) are based on the foregoing non-patent document 1, the non-patent document 1 is invoked for detailed description of each model equation.

When a battery operation causes a battery current, reaction current $j^{Li}$ is determined depending on a sensor value Ib representing the battery current, and transport current density $/i_{nj}$ in equation (M1) is defined according to equation (M6).

When battery current Ib is zero (Ib=0), battery voltage Vb defines the terminal voltage corresponding to the potential difference between solid state potential $\phi_s$ of the positive electrode and solid state potential $\phi_s$ of the negative electrode.

Based on the current conditions and/or voltage conditions thus defined, electrode reaction model unit 61 analyzes the insertion (reduction reaction) and desorption (ionization reaction) of the lithium between the electrolyte and active materials 18p and 18n, according to the Butler_Volmer equation.

Differential equations obtained by appropriately setting the boundary conditions, at various points in the active materials 18p and 18n as well as the electrolyte, in the battery model equations of equations (M1)-(M15) are successively solved. Thereby, various variables represented in FIG. 4, i.e., the state estimation values of secondary battery 10 are successively calculated. Thereby, it is possible to estimate the changes that occur in battery state with time and reflect the internal reaction of the secondary battery.

In this embodiment, boundary condition setting unit 66 sets the boundary condition of equation (M7) by following equations (C1) and (C2).

$$\frac{\delta(\varepsilon_s c_s)}{\delta t} = -\frac{j^{Li}}{a_s F} \quad (r = r_s) \quad \text{(C1)}$$

$$\frac{\delta c_s}{\delta r} = 0 \quad (r = 0) \quad \text{(C2)}$$

Figure 7:
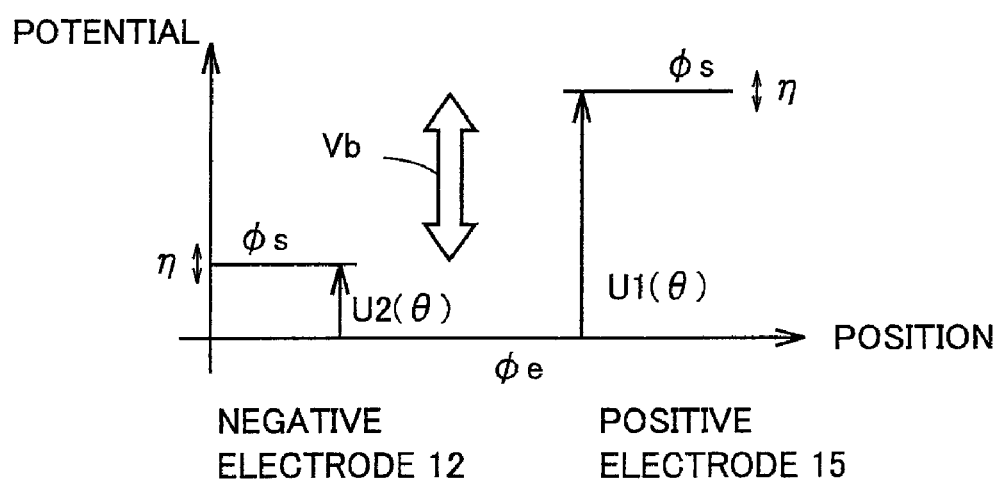
FIG. 7 is a conceptual diagram illustrating potential relationships in positive electrode and negative electrode.

In the electrochemically balanced states, as shown in FIG. 7, negative electrode 12 is in the state where negative electrode OCP (Open-Circuit Potential) U1(θ) determined by the lithium concentrations at the interface of negative active material 18n and in the electrolyte is equal to the potential difference between potential $\phi_e$ of the electrolyte and solid state potential $\phi_s$ of active material 18n in negative electrode. However, it can be considered that when a potential difference (overvoltage η) occurs between them, the lithium is emitted or taken in at the interface according to overvoltage η that corresponds to a shift or deviation from the electrochemically balanced state. Likewise, the electrochemical reaction at the interface of positive electrode 15 depends on overvoltage η that is obtained from positive electrode OCP (Open-Circuit Potential) U2(θ), potential $\phi_e$ of the electrolyte and solid state potential $\phi_s$ of active material 18p in positive electrode.

The boundary conditions in foregoing equations (C1) and (C2) are set for formulating the above phenomenon. Thereby, it is possible to obtain the battery model in which the boundary condition at the electrode interface is formulated such that the positional (spatial) difference in material concentration does not determine the reacting weight at the interface, but the deviation from the electrochemically balanced state causes the changes in lithium concentration at the interface with time, and thus causes the drive power (on the time axis) of the material transport.

Consequently, even when a charge/discharge current starts to occur in the state when the battery is sufficiently relaxed to eliminate the temperature difference, the actual battery behavior can be represented further precisely without performing arbitrary algorithm processing, and the precision of estimation of the internal state of the secondary battery can be improved.

The battery information (SOC, Win, Wout and the like) for restricting the charge and discharge of the secondary battery is produced based on the state estimation values that are calculated by battery model unit 60 thus structured. Thereby, the appropriate charge/discharge control can be executed to deliver the battery performance to the maximum extent while preventing the overcharge and overdischarge.

In the above battery model, the SOC is obtained from the number of lithium atoms in active material 18n in negative electrode. By estimating the distributions of lithium ion concentration inside active materials 18p and 18n, it is possible to predict the battery state reflecting the charge/discharge history. For example, when the discharge is performed after the present SOC is achieved by the charging, this discharge will lower the output voltage more slowly that the case where the discharge is performed after the present SOC of the same value is achieved by the discharging, and this kind of phenomenon can be predicted. More specifically, the lithium concentration in active material 18n in negative electrode is relatively high on the surface side immediately after the charging. Meanwhile, in the discharge operation, the lithium concentration in active material 18n in negative electrode is relatively low on the surface side. Therefore, the foregoing prediction can be performed by reflecting the lithium concentration distribution in the active material.

Second Embodiment

In and after the second embodiment, the charge/discharge control based on the state estimation values that are calculated according to the battery model discussed in connection with the first embodiment is successively exemplified. First, the second embodiment is discussed in connection with the charge/discharge control reflecting the distribution in secondary battery 10 of the state estimation value that is calculated by battery model unit 60.

(Charge/Discharge Control According to Internal Distribution of Lithium Concentration)

Figure 8:
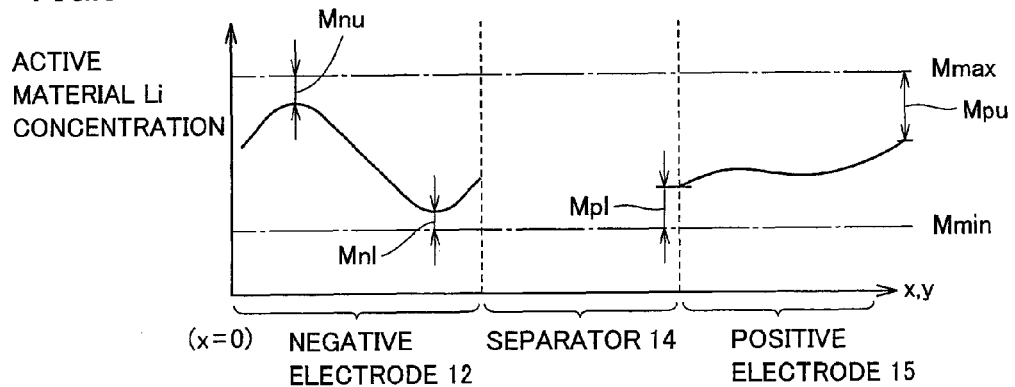
FIG. 8 is a first diagram illustrating charge/discharge restrictions in view of a lithium ion concentration distribution inside a secondary battery.
Figure 9:
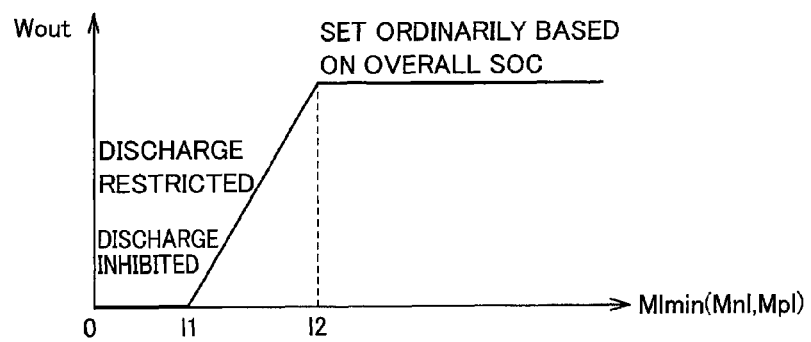
FIG. 9 is a second diagram illustrating the charge/discharge restrictions in view of the lithium ion concentration distribution inside the secondary battery.
Figure 10:
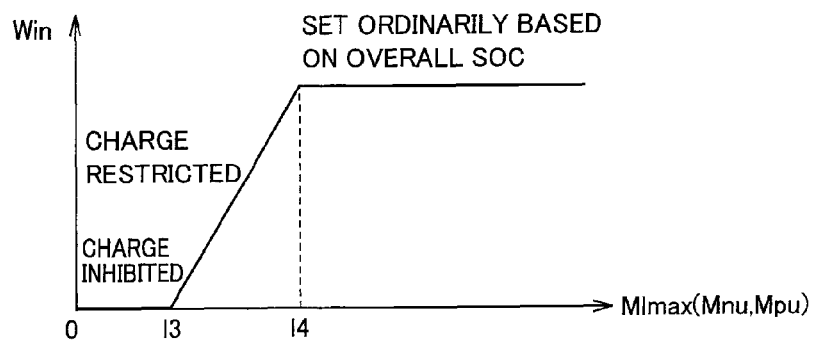
FIG. 10 is a third diagram illustrating the charge/discharge restrictions in view of the lithium ion concentration distribution inside the secondary battery.

FIGS. 8 to 10 illustrate charge/discharge restrictions in view of the internal distribution of the lithium ion concentration that is handled as the internal state of the secondary battery.

In FIG. 8, the abscissa gives positional spreading inside the secondary battery (e.g., spreading in the x- and y-directions in the battery model coordinates shown in FIG. 2). The ordinate gives the lithium concentration in active material 18. Thus, FIG. 8 shows distribution prediction performed according to the battery model on the lithium concentration inside secondary battery 10 at a certain point in time. This distribution prediction is successively updated with time during the charge/discharge operation. An upper limit management value Mmax and a lower limit management value Mmin are predetermined for the local lithium concentration.

Battery information generating unit 70 obtains, for the active material lithium concentration in the range of negative electrode 12, an upper limit margin value Mnu that is a difference between the maximum value and upper limit management value Mmax as well as a lower limit margin value Mnl between the minimum value and lower limit management value Mmin. Likewise, battery information generating unit 70 obtains upper and lower limit margin values Mpu and Mpl of the active material lithium concentration in the region of positive electrode 15.

Referring to FIG. 9, battery information generating unit 70 sets outputtable power Wout based on a local lower limit margin Mlmin with respect to lower limit management value Mmin (corresponding to the minimum values of Mnl and Mpl in FIG. 8) of the active material lithium concentration in the battery.

When local lower limit margin Mlmin is equal to or higher than a determination value 11, Wout is set to 0 (Wout=0) to inhibit the discharge from secondary battery 10 for preventing deterioration due to local overdischarge.

Conversely, when local lower limit margin Mlmin of a determination value 12 or more is ensured, the discharge restriction from the local distribution of the lithium concentration is not performed, and outputtable power Wout is set in the ordinary manner. For example, outputtable power Wout in the ordinary state is set by a general manner based on the general SOC (overall SOC) used for macroscopically evaluating the overall state of secondary battery 10. The overall SOC is generally obtained based on the integration of the charge/discharge current, or by correcting this integrated value based on sensor-sensed values such as a battery temperature and others.

When local lower limit margin Mlmin is in a range between 11 and 12, the discharge is restricted to a higher extent than the ordinary state. More specifically, outputtable power Wout is set smaller than that in the case local lower limit margin Mlmin of determination value 12 or more is ensured. In this case, it is preferable that outputtable power Wout is set in a continuous or stepwise fashion according to local lower limit margin Mlmin.

Further, as shown in FIG. 10, battery information generating unit 70 likewise sets inputtable power Win according to the local distribution of the lithium concentration.

Referring to FIG. 10, battery information generating unit 70 sets inputtable power Win based on local upper limit margin Mlmax (corresponding to the maximum values of Mnu and Mpu in FIG. 5) with respect to upper limit management value Mmax of the active material lithium concentration inside the battery.

When local upper limit margin Mlmax is equal to or higher than a determination value 13, value Win is set to zero (Win=0) to inhibit the charging of secondary battery 10 for preventing deterioration due to the local overcharge. When local upper limit margin Mlmax of a determination value 14 or more is ensured, the charge restriction from the local distribution of the lithium concentration is not performed, and inputtable power Win is set in the ordinary manner. For example, inputtable power Win in the ordinary state is set based on the overall SOC, similarly to outputtable power Wout.

Further, when local upper limit margin Mlmax is in a range between determination values 13 and 14, the charging is restricted as compared with the ordinary state, and inputtable power Win is set smaller than that in the case where local upper limit margin Mlmax is equal to or higher than determination value 14. In this case, it is preferable to set inputtable power Win in a continuous or stepwise fashion according to local upper limit margin Mlmax.

As described above, inputtable power Win or outputtable power Wout can be restricted in the case where disadvantageous rising or lowering of the local lithium concentration may occur, according to the battery model equation reflecting the electrode reaction inside the battery. Consequently, it is possible to prevent such a situation that the local lithium concentration rises (overcharge) or lowers (overdischarge) to exceed the limit due to the difference that occurs in degree of use of the electrode active material inside the secondary battery, and thereby the local deterioration can be prevented.

In the ordinary state in which the lithium concentration neither rises nor lowers locally, inputtable and outputtable powers Win and Wout may likewise be set strictly based on the internal distribution of the lithium concentration. However, inputtable and outputtable powers Win and Wout may be set based on the general overall SOC that has been employed in many cases. Thereby, it is possible to simplify the arithmetic processing for inputtable and outputtable powers Win and Wout while ensuring the control stability to a certain extent.

(Charge/Discharge Control According to Internal Temperature Distribution)

Figure 11:
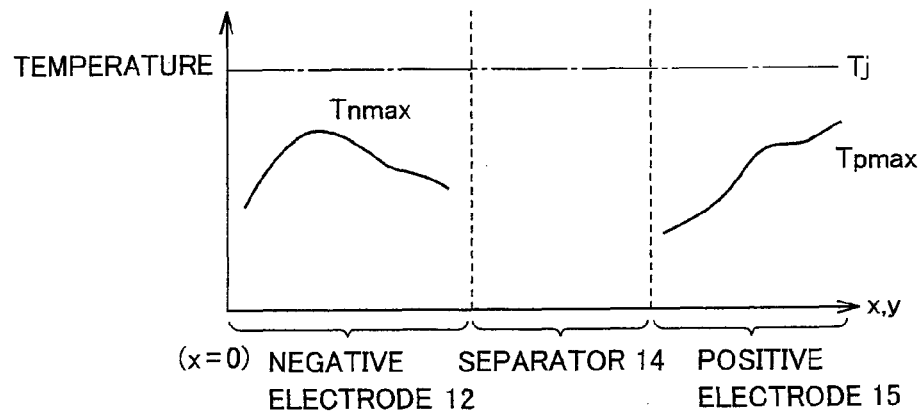
FIG. 11 is a first diagram illustrating the charge/discharge restrictions in view of a temperature distribution inside the secondary battery.

FIG. 11 illustrates prediction of the temperature distribution inside secondary battery 10 at a certain point in time according to the battery model, similarly to FIG. 8. An upper limit management value Tj is predetermined for the local internal temperature.

Referring to FIG. 11, battery information generating unit 70 obtains a local maximum temperature Tnmax in negative electrode 12 and a local maximum temperature Tpmax in positive electrode 15.

Figure 12:
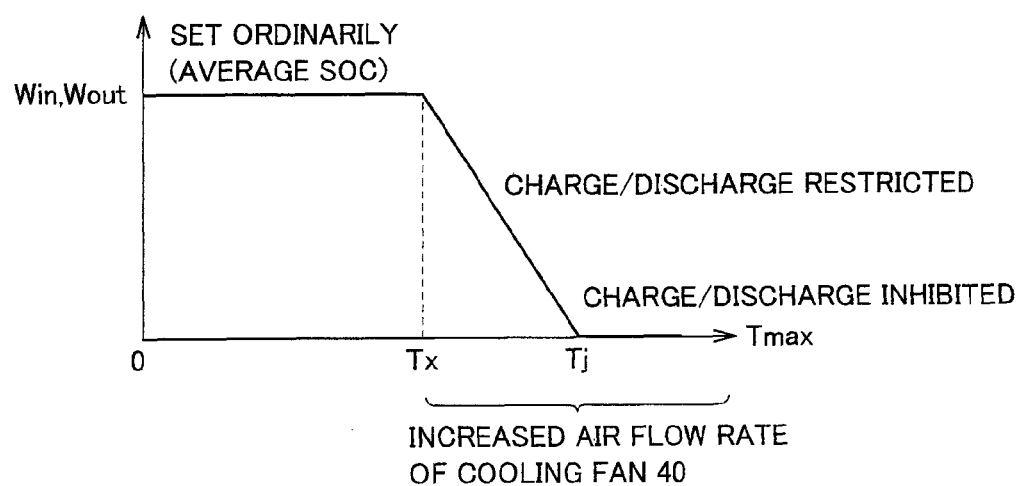
FIG. 12 is a second diagram illustrating the charge/discharge restrictions in view of the temperature distribution inside the secondary battery.

Referring to FIG. 12, battery information generating unit 70 sets inputtable and outputtable powers Win and Wout based on a local maximum temperature Tmax (corresponding to the maximum values of Tnmax and Tpmax in FIG. 11) in the battery.

When local maximum temperature Tmax is equal to or lower than a determination value Tx, the charge/discharge restrictions based on the temperature distribution are not performed, and the ordinary setting of the inputtable and outputtable powers is performed, e.g., based on the overall SOC, similarly to the operation illustrated in FIGS. 9 and 10.

When local maximum temperature Tmax is equal to or higher than upper limit management value Tj, the charge and discharge are inhibited for preventing the local deterioration and thermal runaway of the battery, and both values Win and Wout are set to zero (Win=Wout=0).

When local maximum temperature Tmax is in a range between Tx and Tj, the charge and discharge are restricted to a higher extent than those in the ordinary state, and inputtable and outputtable powers Win and Wout are restricted to a higher extent than that in the case where local maximum temperature Tmax is equal to or higher than determination value Tx. In this case, it is preferable that inputtable and outputtable powers Win and Wout are set in a continuous or stepwise fashion according to local maximum temperature Tmax.

As described above, inputtable power Win or outputtable power Wout can be restricted when disadvantageous rising or lowering of the local temperature may occur, according to the battery model equation reflecting the electrode reaction inside the battery. Consequently, it is possible to prevent such a situation that the local temperature rises due to the occurrence of the difference in degree of use of the electrode active material inside the secondary battery, and thereby the local deterioration and/or thermal runaway occurs.

In the range of (Tmax>Tx) where the charge and discharge are restricted or inhibited, ECU 50 shown in FIG. 1 provides a control command to cooling fan 40 to start the operation of cooling fan 40, or to increase a quantity of coolant (cooling air flow rate) supplied by cooling fan 40 that is already operating. In particular, it is preferable that the operation of cooling fan 40 is set to increase the cooling air flow rate in a continuous or stepwise fashion according to the rising of local maximum temperature Tmax.

(Charge/Discharge Control According to Terminal Voltage)

Figure 13:
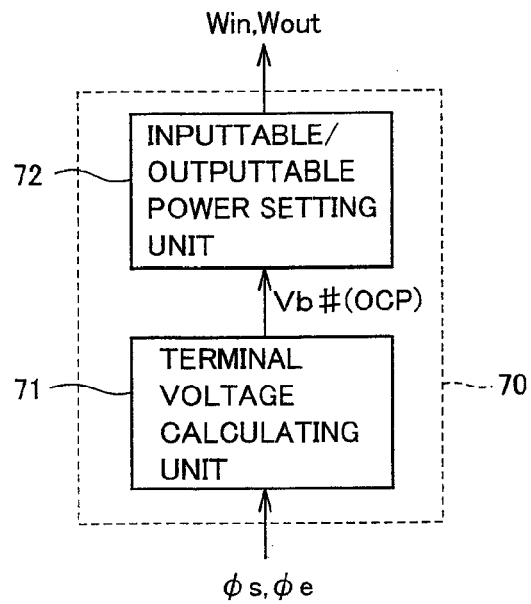
FIG. 13 is a block diagram illustrating the charge/discharge restrictions in view of a potential distribution inside the secondary battery.
Figure 14:
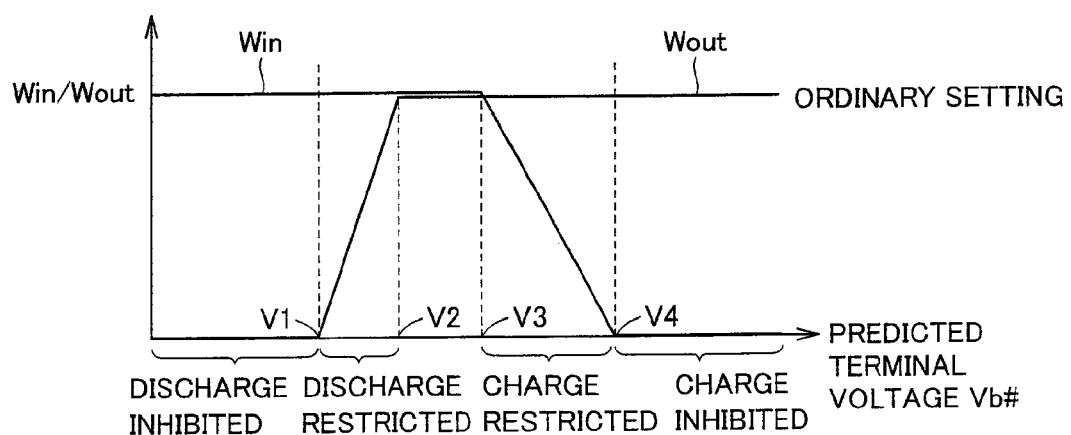
FIG. 14 illustrates the charge/discharge restrictions in view of a predicted terminal voltage according to the potential distribution inside the secondary battery.

Further, as shown in FIGS. 13 and 14, battery information generating unit 70 sets inputtable and outputtable powers Win and Wout based on potential distributions $\phi_e$ and $\phi_s$ that are predicted as the internal state by battery model unit 60.

Referring to FIG. 13, battery information generating unit 70 includes a terminal voltage calculating unit 71 and an inputtable/outputtable power setting unit 72.

Terminal voltage calculating unit 71 calculates a predicted terminal voltage Vb# (or a predicted electromotive force OCP) based on local potential distributions $\phi_e$ and $\phi_s$ inside the secondary battery that are predicted by battery model unit 60. Inputtable/outputtable power setting unit 72 calculates inputtable and outputtable powers Win and Wout based on predicted terminal voltage Vb# (or a predicted electromotive force OCP) calculated by terminal voltage calculating unit 71.

Referring to FIG. 14, inputtable/outputtable power setting unit 72 sets the inputtable and outputtable powers according to the comparison between predicted terminal voltage Vb# and determination values V1-V4.

When the predicted terminal voltage lowers excessively into a range of (Vb#<V1), inputtable/outputtable power setting unit 72 sets outputtable power Wout to zero (Wout=0) for inhibiting further discharging. When the predicted terminal voltage has not lowered excessively and is in a range of (Vb#>V2), battery information generating unit 70 does not perform the discharge restriction due to the lowering of the terminal voltage, and performs the ordinary setting of the outputtable power, e.g., based on the overall SOC, similarly to the operation described with reference to FIGS. 6 and 7. Further, in the range of (V1<Vb#<V2), the discharging is restrictively allowed (Wout>0), but outputtable power Wout is restricted to be lower than the ordinary range of (Vb#>V2).

Likewise, when the predicted terminal voltage rises excessively, inputtable/outputtable power setting unit 72 sets inputtable power Win to zero (Win=0) for inhibiting further charging. When the predicted terminal voltage has not risen to a large extent and is in a range of (Vb#<V3), inputtable/outputtable power setting unit 72 does not perform the discharge restriction due to the rising of the terminal voltage, and performs the ordinary setting of the inputtable power, e.g., based on the overall SOC, similarly to the foregoing case. Further, in the range of (V3<Vb#21 V4), the charging is restrictively allowed (Win>0), but inputtable power Win is restricted to be lower than the ordinary range (Vb#<V3).

Thereby, the charge/discharge of the secondary battery can be controlled based on the local potential distribution inside the battery such that the terminal voltage (i.e., the electromotive force) may neither rise (overcharge) nor lower (overdischarge) to exceed the limits.

(Whole Charge/Discharge Control)

Figure 15:
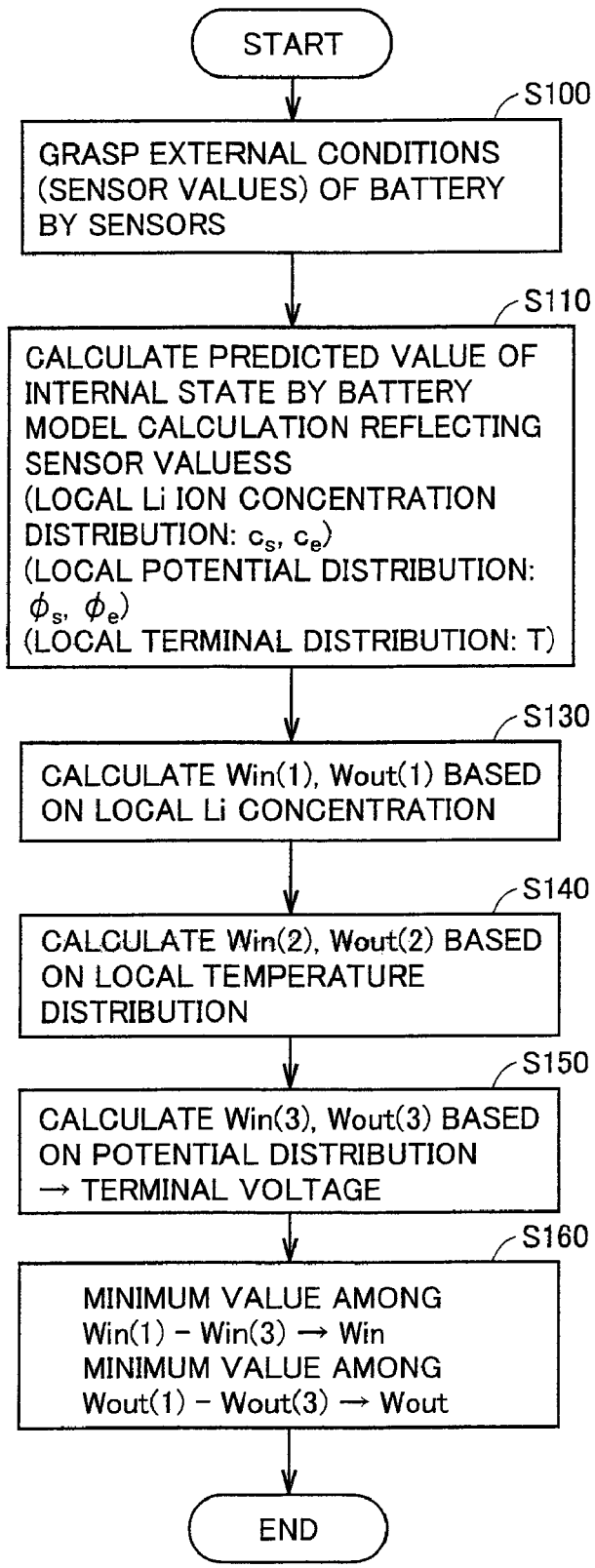
FIG. 15 is a flowchart illustrating charge/discharge control according to a second embodiment.

FIG. 15 is a flowchart illustrating the charge/discharge control according to the second embodiment.

Referring to FIG. 15, battery ECU 50 grasps the external battery conditions (battery temperature Tb, battery current Ib and battery voltage Vb) from sensed values of sensors 30, 32, 34 employed in secondary battery 10 in step S100.

Battery ECU 50 calculates, by the function of battery model unit 60, the predicted values of the internal state of the secondary battery from the numerical calculation according to the battery model (equations (M1)-(M15), (C1) and (C2)) reflecting the sensed values in step S110. As already described, this internal state includes the local lithium ion concentration distributions ($c_s$ and $c_e$), the local potential distributions ($\phi_e$ and $\phi_s$) and the local temperature distribution (T).

In step S130, battery ECU 50 calculates inputtable and outputtable powers Win(1) and Wout(1) according to the manner shown in FIGS. 8-10, based on the lithium concentration distribution inside the battery. In step S140, battery ECU 50 likewise calculates inputtable and outputtable powers Win(2) and Wout(2) according to the manner shown in FIGS. 11 and 12, based on the temperature distribution inside the battery. In step S150, battery ECU 50 calculates inputtable and outputtable powers Win(3) and Wout(3) according to manner shown in FIGS. 13 and 14, based on the predicted terminal voltage calculated using local potential distributions $\phi_e$ and $\phi_s$.

Further, in step S160, battery ECU 50 selects, as final inputtable power Win, the minimum value from among inputtable powers Win(1)-Win(3) that are calculated based on the lithium concentration distribution, temperature distribution and potential distribution in the steps S130-S150, respectively. Further, battery ECU 50 selects, as final outputtable power Wout, the minimum value from among outputtable powers Wout(1)-Wout(3) calculated in steps S130-S150, respectively. Thus, the processing in steps S130-S160 corresponds to the functions of battery information generating unit 70.

As described above, the charge/discharge control of the secondary battery of the second embodiment of the invention can estimate, according to the battery model, the internal reaction of the secondary battery, i.e., the degrees of local use of the active material in the respective regions of the battery, and can appropriately restrict the charge/discharge of secondary battery 10 to avoid the phenomenon that may cause the local deterioration of the battery.

FIG. 15 illustrates the manner of controlling the charge/discharge in view of the three kinds of internal distributions, i.e., the lithium ion concentration distribution (S130), the temperature distribution (S140) and terminal voltage (150) based on the potential distribution. However, the charge/discharge control can be performed using only one or some of these three kinds of internal distributions. Alternatively, the charge/discharge control can be performed based on other internal state distribution(s) estimated by battery model unit 60 or based on a combination of at least one of the internal distributions already exemplified and other internal distribution(s).

Third Embodiment

The prediction precision of the internal state of the battery according to the battery model employed in the first embodiment depends on the precision of the constants (parameters) used in the battery model. The third embodiment will be described in connection with updating of parameters in battery model unit 60 as well as estimation of a remaining life related to the parameter updating.

Figure 16:
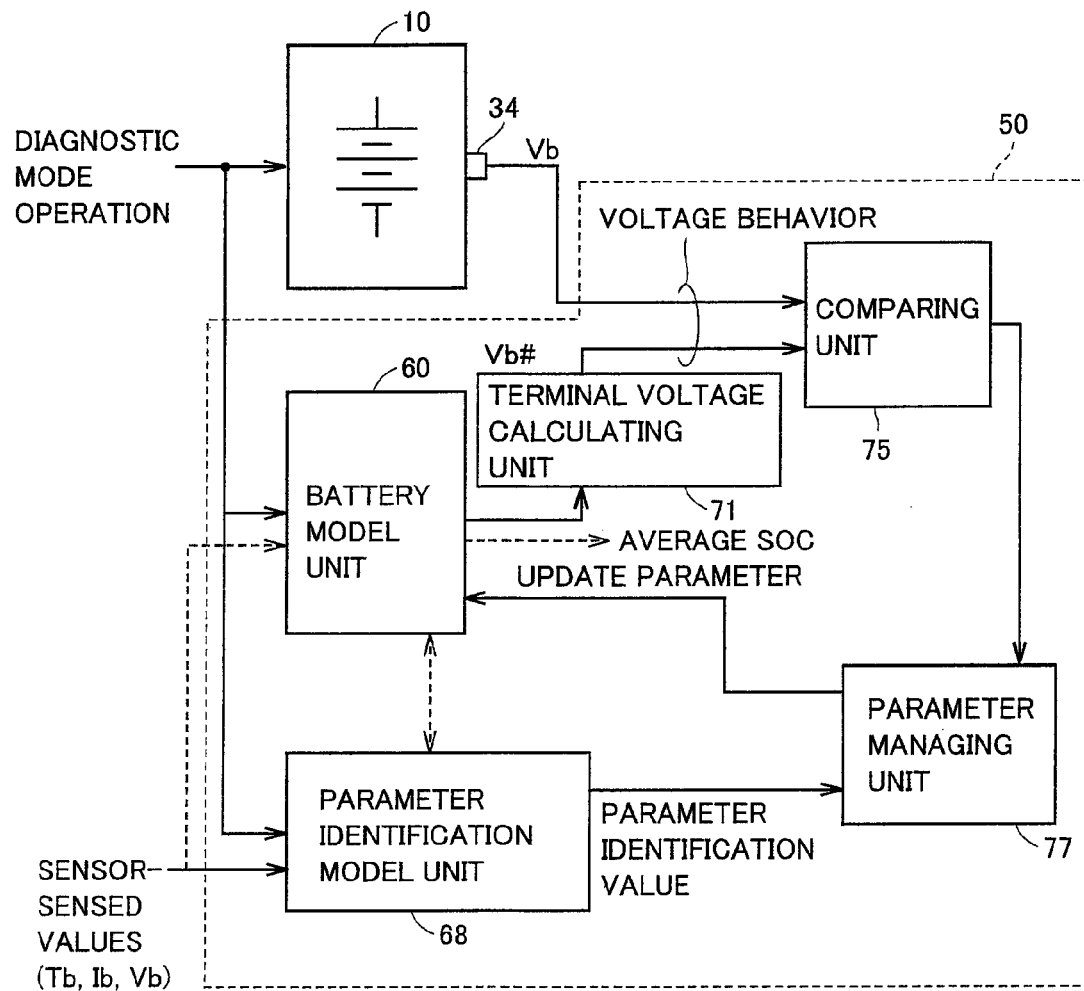
FIG. 16 is a block diagram illustrating a functional structure of a battery ECU according to a third embodiment.

FIG. 16 is a block diagram illustrating a functional structure of a battery ECU according to the third embodiment.

Referring to FIG. 16, battery ECU 50 according to the third embodiment includes battery model unit 60, a parameter identification model unit 68, a terminal voltage calculating unit 71, a comparing unit 75 and a parameter managing unit 77.

Figure 17:
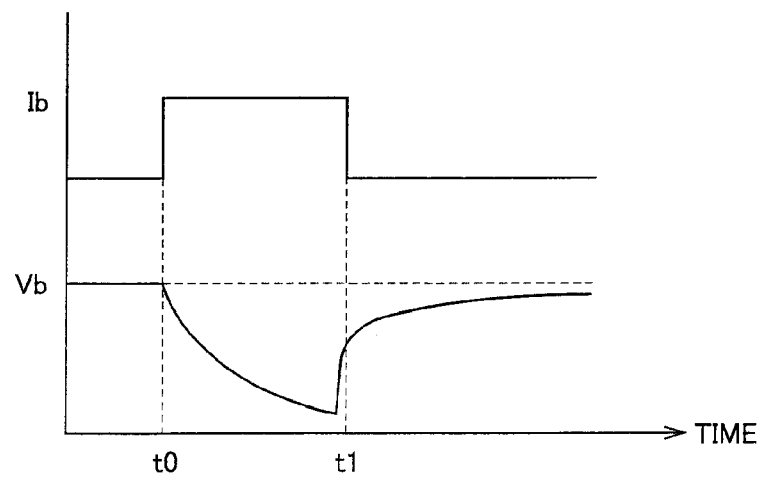
FIG. 17 is a conceptual diagram illustrating a secondary battery operation in a diagnostic mode.

The third embodiment employs a diagnostic mode for secondary battery 10 as shown in FIG. 17.

Referring to FIG. 17, secondary battery 10 in the diagnostic mode performs a diagnosing operation to output a constant current in a pulse form between times t0 and t2. This diagnosing operation causes battery voltage Vb to return gradually after cut-off of the pulse current (i.e., after time t2) according to the output of the pulse-like current. Voltage sensor 34 senses this voltage behavior, and provides battery voltage Vb to comparing unit 75. It is preferable that this diagnostic mode starts after a predetermined time of about 30 minutes elapsed from the end of use of the secondary battery and the secondary battery attained the static internal state.

Battery model unit 60 predicts the internal state of the secondary battery in this diagnostic mode according to the battery model. Consequently, terminal voltage calculating unit 71 calculates predicted terminal voltage Vb#, and provides it to comparing unit 75.

Parameter identification model unit 68 can identify a part of the parameters used in the battery model based on the secondary battery behavior in the diagnostic mode operation. For example, it can estimate exchange current density $i_O$ based on the voltage behavior in the operation of outputting the pulse-like current. Also, parameter identification model unit 68 can estimate diffusion coefficient $D_s$ in the positive electrode based on the voltage behavior after the cut-off of the pulse current. The parameter to be identified depends on the identification model prepared in parameter identification model unit 68.

Comparing unit 75 compares actual battery voltage Vb sensed by voltage sensor 34 with predicted terminal voltage Vb# based on the prediction by battery model unit 60. When a large difference is present between them, comparing unit 75 notifies parameter managing unit 77 of it.

When comparing unit 75 determines that a prediction error in voltage behavior is large, parameter managing unit 77, as to the parameters identified by parameter identification model unit 68, and updates the parameter values used in the battery model to the parameter values identified by parameter identification model unit 68.

Figure 18:
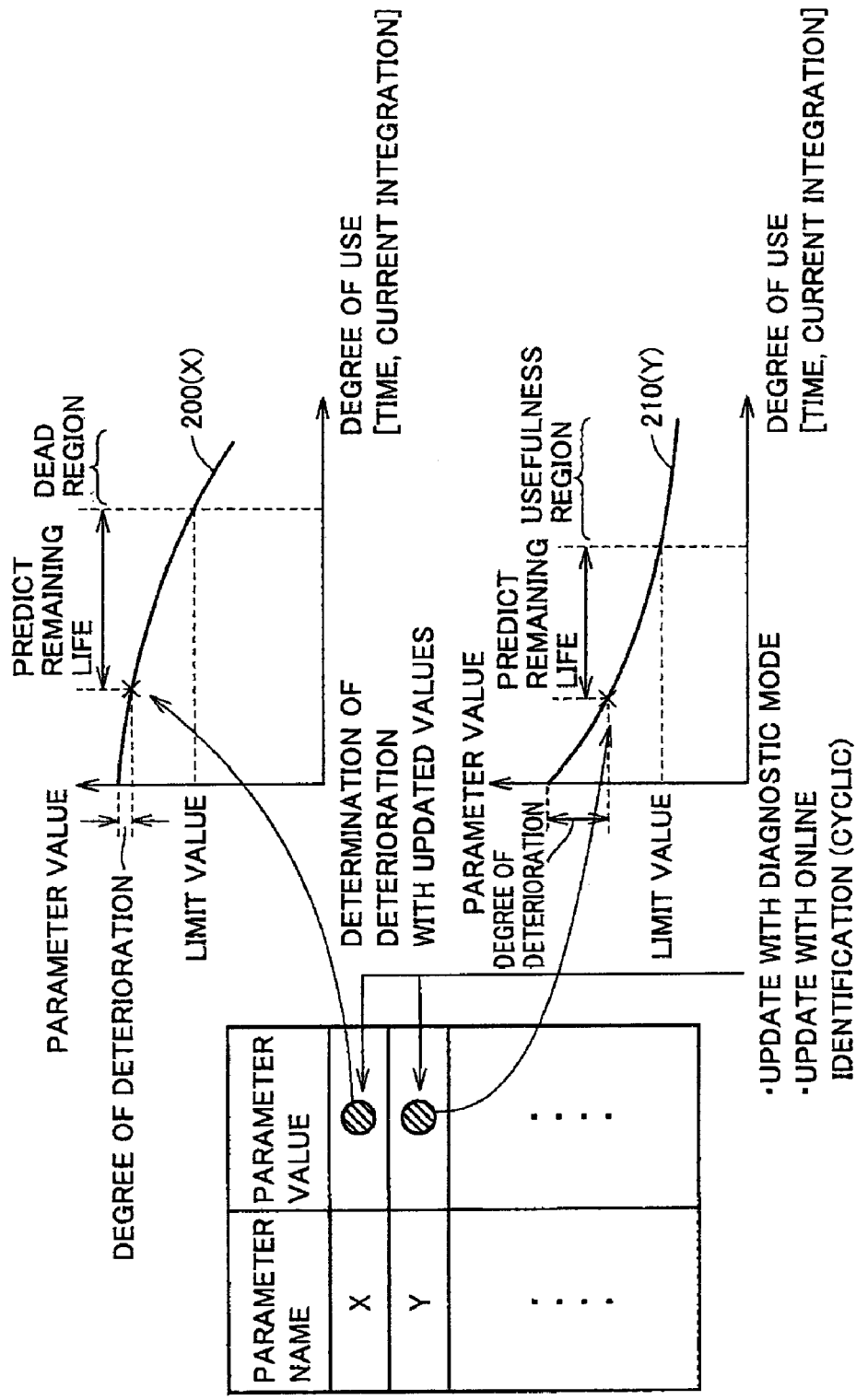
FIG. 18 is a conceptual diagram illustrating a remaining life assessment of the secondary battery according to the third embodiment.

Referring to FIG. 18, description will now be given on the diagnosis of the remaining life of the secondary battery related to the foregoing parameter updating.

Referring to FIG. 18, changes in parameter value corresponding to the degree of use of the secondary battery, i.e., the deterioration characteristics are obtained in advance in connection with the parameters (exemplified as X and Y in FIG. 18) that are handled as parameter update targets by parameter managing unit 77. For example, the period (time) of use or the charge/discharge current integration value is used as the degree of use of the secondary battery. Particularly, when the secondary battery of which charge and discharge are controlled according to the invention is mounted on a vehicle such as a hybrid vehicle, a distance traveled or a travel period may be used as the degree of use of the battery.

As shown in FIG. 18, a deterioration characteristic line 200 relating to parameter X to be updated is obtained in advance, and a deterioration characteristic line 210 relating to a parameter Y is obtained in advance.

In connection with deterioration characteristic lines 200 and 210, limit values of the respective parameters are obtained in advance, and it is determined that the battery enters a dead region, when the parameter value changes (lowers or rises) beyond the limit value.

In the parameter updating operation, it is possible to estimate the remaining life relating to the degree of use of the secondary battery, from the difference between the parameter value at the time of the updating and the foregoing limit value. Also, the degree of deterioration can be estimated according to the amount of change of the parameter value from the initial value.

Figure 19:
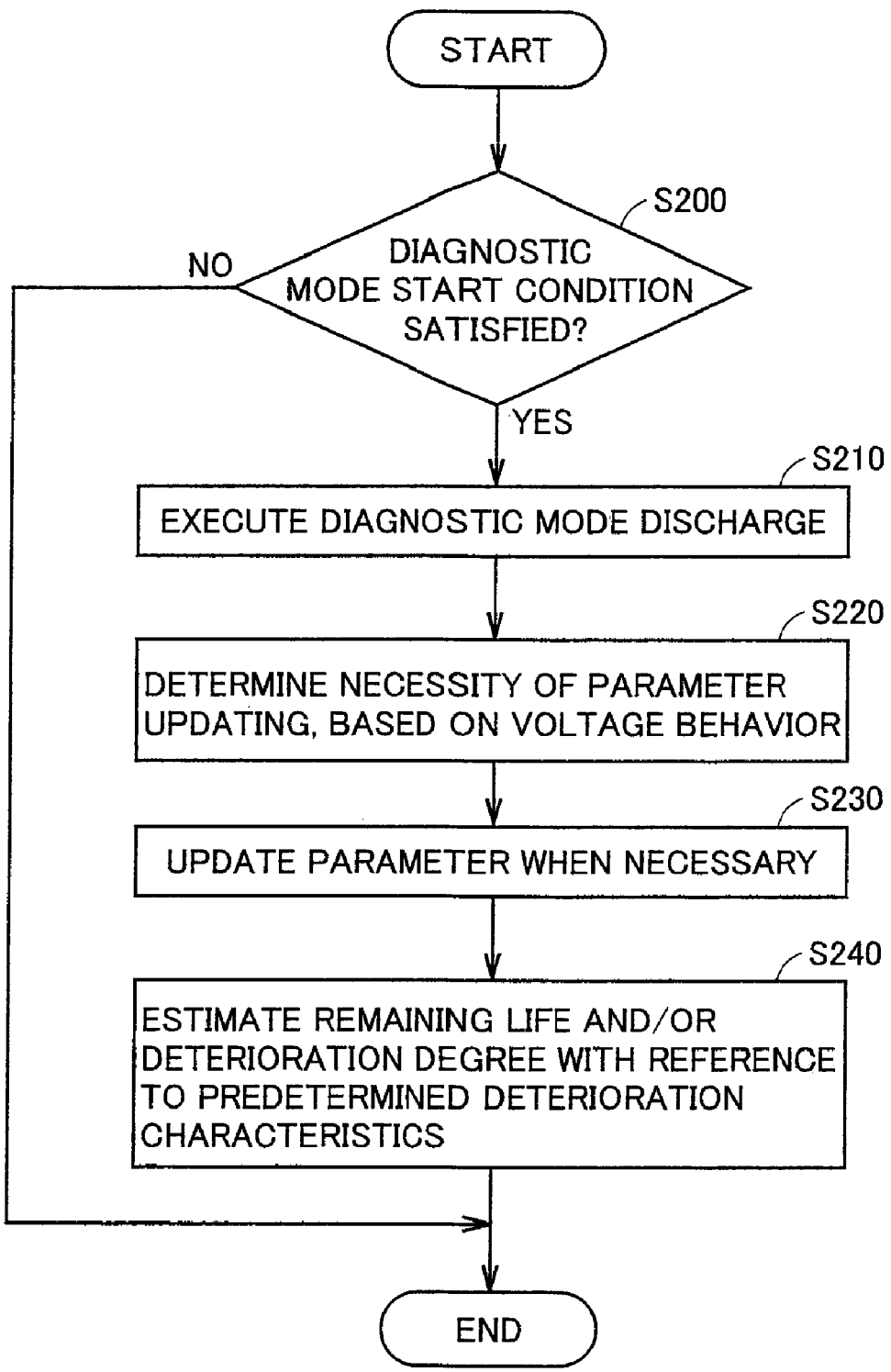
FIG. 19 is a flow chart illustrating the diagnostic mode according to the third embodiment.

FIG. 19 is a flowchart illustrating a diagnostic mode according to the third embodiment.

Referring to FIG. 19, battery ECU 50 determines in step S200 whether a condition for starting the diagnostic mode is satisfied or not. This start condition of the diagnostic mode is satisfied every time a certain period expires or every time a vehicle equipped with the battery runs a certain distance. Alternatively, the start condition of the diagnostic mode may be satisfied according to a deviation between the overall SOC obtained based on the integration value of battery current Ib and the average SOC which is independently obtained as an average value of the lithium ion concentration distribution obtained by battery model unit 60.

Battery ECU 50 ends the processing without executing subsequent steps when the diagnostic mode start condition has not satisfied (NO in step S200).

When the diagnostic mode start condition is satisfied (YES in step S200), battery ECU 50 instructs the execution of the diagnostic mode discharge shown in FIG. 17 in step S210.

In step S220, battery ECU 50 determines whether the parameter updating is required or not, based on the behavior of battery voltage Vb in the diagnostic mode. This processing corresponds to the operation of comparing unit 75 in FIG. 16. Further, battery ECU 50 updates the parameter in step S230, when necessary. This processing corresponds to the parameter updating operation by parameter managing unit 77 and parameter identification model unit 68 shown in FIG. 16.

When the parameters are updated, battery ECU 50 compares, in step S240, the updated parameters with the deterioration characteristics (deterioration characteristic lines 200 and 210 in FIG. 18) that are obtained in advance, and thereby estimates the remaining life and/or the deterioration degree of the secondary battery illustrated in FIG. 18. A notification about the estimated remaining life and/or the deterioration degree may be provided to a driver or a service person, e.g., by displaying them on a predetermined screen.

The structure described above can successively update the parameters of the battery model equation when a large deviation is present between the actual behavior of secondary battery 10 and the prediction according to the battery model. Thereby, the internal state of the battery can be grasped more accurately so that the battery performance at that point in time can be utilized to the maximum extent. In connection with the charge/discharge control already described in connection with the first embodiment, it is possible to prevent more reliably the local deterioration and the thermal runaway.

Further, the remaining life of the secondary battery can be determined along with the parameter updating, and will be informed to the driver. This achieves effective use of the secondary battery and improved convenience of the driver.

Modification of Third Embodiment

A modification of the third embodiment will be described in connection with the structure that updates the parameters based on the data during the use of secondary battery 10 without executing a particular diagnostic mode.

Figure 20:
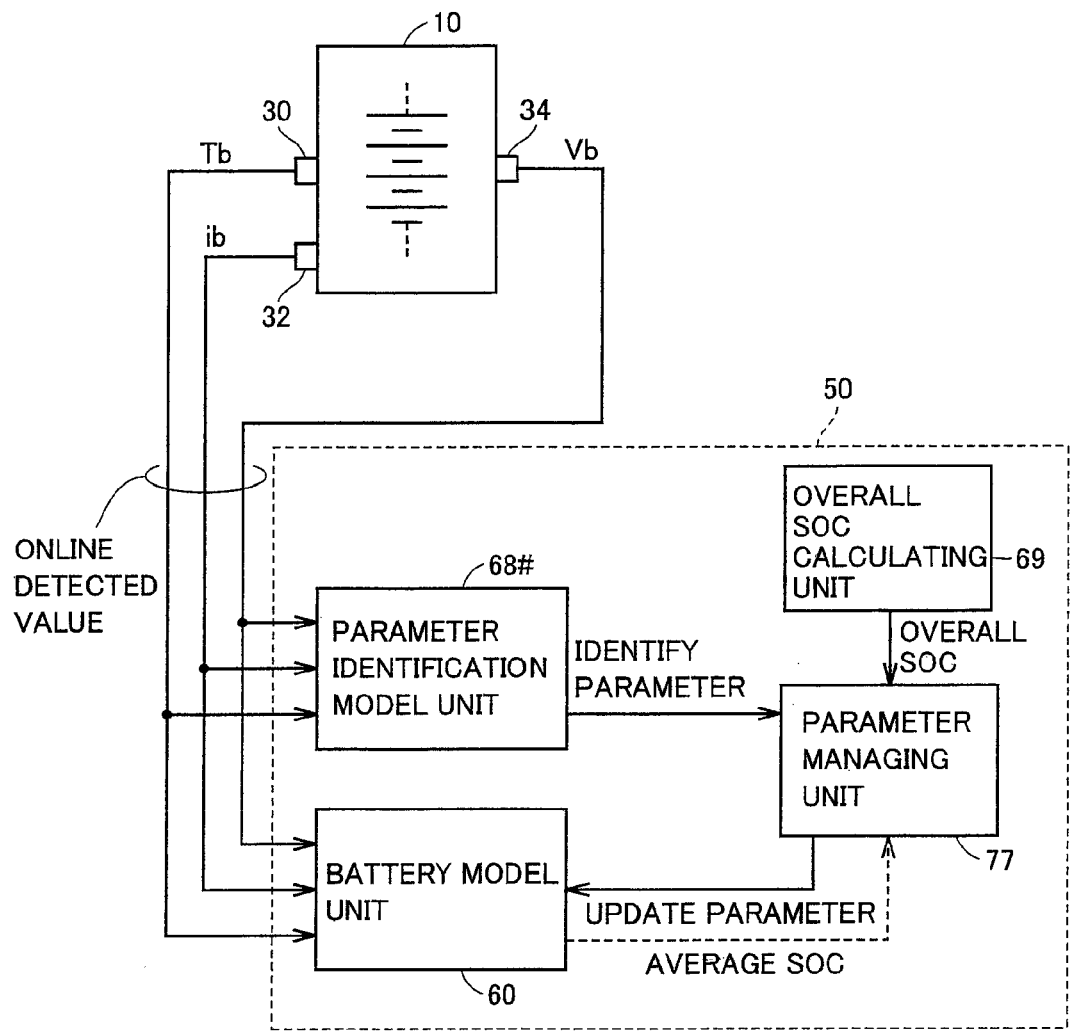
FIG. 20 is a block diagram illustrating a functional structure of a battery ECU according to a modification of the third embodiment.

FIG. 20 is a block diagram illustrating a functional structure of a battery ECU according to the modification of the third embodiment.

Referring to FIG. 20, battery ECU 50 according to the modification of the third embodiment includes battery model unit 60, a parameter identification model unit 68#, an overall SOC calculating unit 69 and parameter managing unit 77.

Parameter identification model unit 68# receives online sensed values (battery temperature Tb, battery current Ib and battery voltage Vb) sensed by sensors 30-34, and operates in parallel with battery model unit 60. More specifically, it uses, as inputs, the online sensed values of secondary battery 10 during actual use, and identifies online the parameters in the battery model equation of battery model unit 60.

Figure 21:
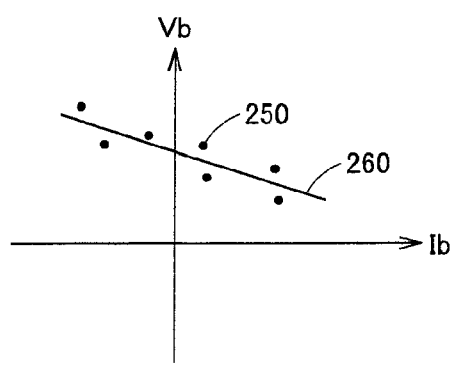
FIG. 21 is a conceptual diagram showing an example of online parameter identification by a parameter identification model unit shown in FIG. 20.

The above parameter identification performed online is allowed depending on the types of the parameters used in the battery model equation. For example, as shown in FIG. 21, a gradient of battery voltage Vb with respect to battery current Ib is obtained from a collection of online characteristic points 250 defined by plotting the relationship between battery current Ib and battery voltage Vb, and thereby an interface DC resistance $R_f$ in the battery model equation can be identified.

Parameter managing unit 77 operates in connection with the parameters that are identified online by parameter identification model unit 68# when the predetermined parameter update condition is satisfied, and particularly updates the parameter values used in the battery model to the parameter identification values determined by parameter identification model unit 68#.

The predetermined parameter update condition is satisfied, e.g., when a deviation of a predetermined magnitude or more occurs between the average SOC that is the average value of the lithium ion concentration distribution obtained by battery model unit 60 and the overall SOC obtained based on the integration value of battery current Ib by overall SOC calculating unit 69, or when the above deviation occurs at a predetermined frequency or more.

By the above structure, the parameters of the battery model equation can be successively updated in connection with the parameters that can be identified online. Thereby, the internal state of the battery can be grasped more accurately so that the battery performance at that point in time can be utilized to the maximum extent. For the parameters that are identified online, deterioration characteristic lines (not shown) similar to deterioration characteristic lines 200 and 210 in FIG. 18 may likewise be set, whereby these parameters can be selected as targets of the estimation of the remaining life and/or the degree of deterioration.

Fourth Embodiment

A fourth embodiment will be described in connection with the control structure in which a result of the predetermined prediction calculation using the state estimation value that is calculated by battery model unit 60 is provided as the battery information to control device 80.

Figure 22:
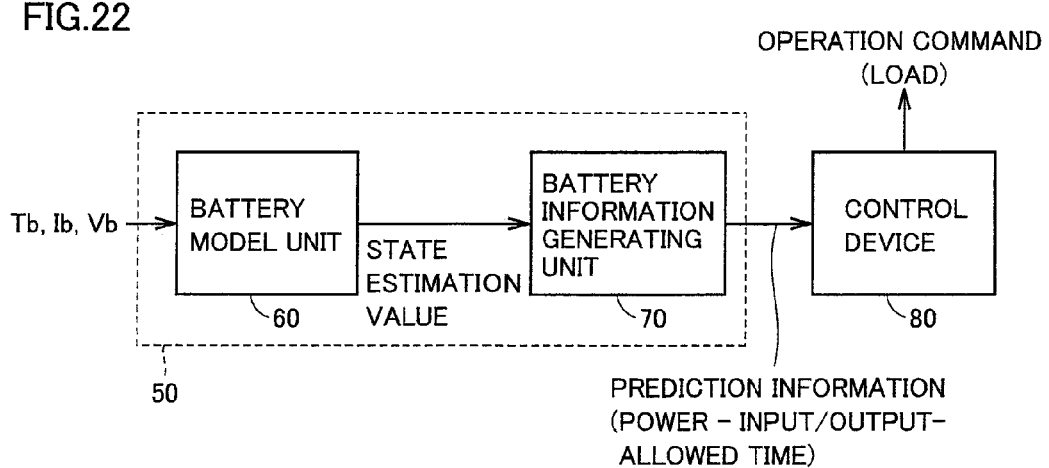
FIG. 22 is a schematic block diagram illustrating a functional structure of a battery ECU according to a fourth embodiment.

FIG. 22 is a schematic block diagram illustrating a functional structure of a battery ECU according to the fourth embodiment.

Referring to FIG. 22, battery ECU 50 includes battery model unit 60 and battery information generating unit 70. As already described in connection with the first embodiment, battery model unit 60 dynamically estimates the internal state of secondary battery 10, and successively updates the state estimation values.

In the fourth embodiment, battery information generating unit 70 performs predetermined prediction calculation using the state estimation values that are calculated by battery model unit 60, thereby produces the prediction information relating to the case where secondary battery 10 is continuously charged/discharged with a predetermined power, and provides this prediction information as the battery information to control device 80. The prediction information represents a predicted input/output-allowed time for which a certain power can be continuously input (charged) or output (discharged) from the present time. Control device 80 produces an operation command for load 20 in view of the prediction information (input/output powers and input/output-allowed times) provided from battery information generating unit 70.

Figure 23:
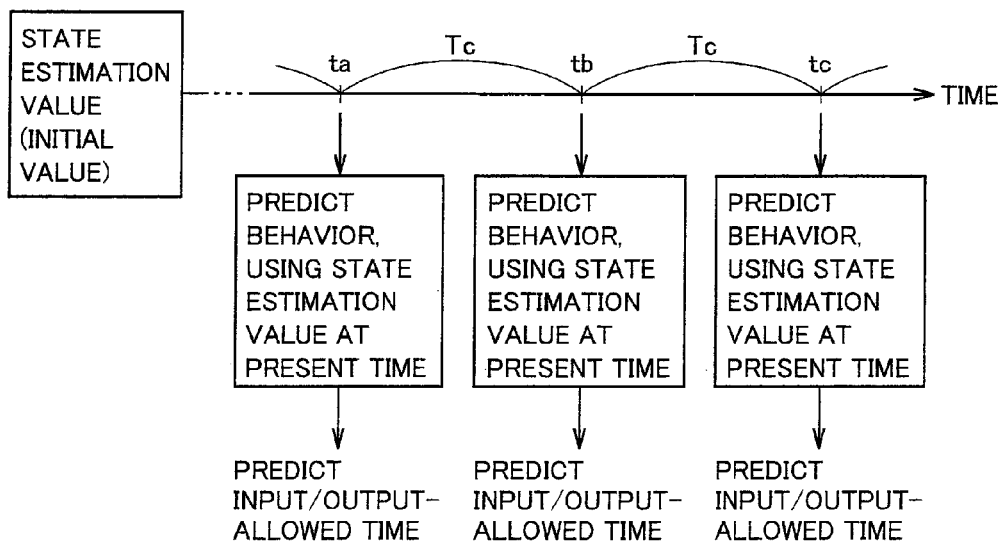
FIG. 23 is a conceptual diagram illustrating operation timing of a battery model unit and a battery information generating unit in charge/discharge control of the secondary battery according to the fourth embodiment.

FIG. 23 is a conceptual diagram illustrating operation timing of battery model unit 60 and battery information generating unit 70 in the charge/discharge control of the secondary battery according to the fourth embodiment.

Referring to FIG. 23, battery model unit 60 operates at predetermined cycles to calculate the state estimation values according to the above battery model equation, based on the sensed values of the sensors 30, 32, 34. In practice, differences from the values obtained by the last estimation calculation are calculated to update the state estimation values. Thereby, the state estimation values of the secondary battery are successively updated based on the sensed values of the sensors 30, 32, 34 indicating the situation of use of the secondary battery, using the initial values as the initial points.

While the internal state of the secondary battery is being successively estimated as described above, battery information generating unit 70 executes the behavior prediction routine at predetermined cycles Tc. This predetermined cycle Tc is equal to or longer than the operation cycle of the battery model unit.

Figure 24:
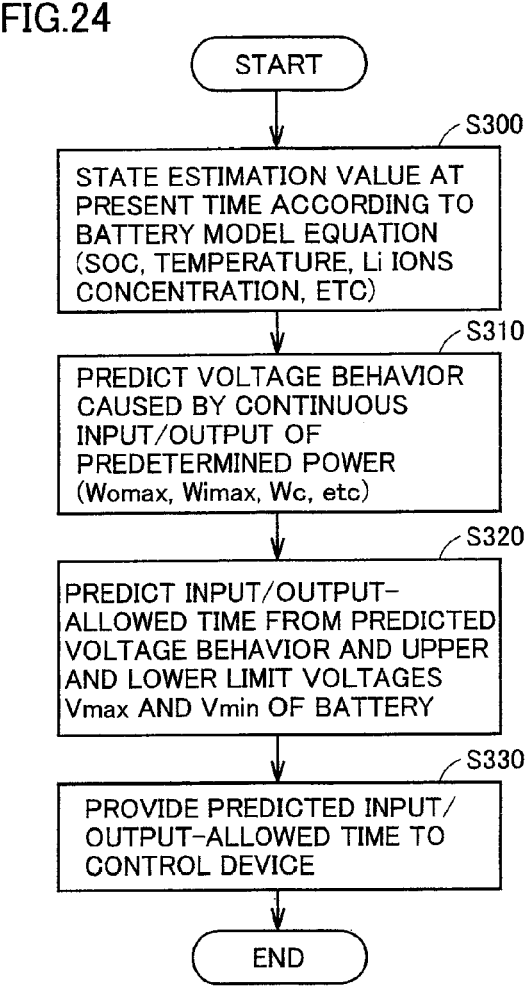
FIG. 24 is a flowchart illustrating a behavior estimation routine executed periodically by a battery information generating unit according to the fourth embodiment.

For example, as shown in FIG. 23, the behavior prediction is executed according to a behavior prediction routine shown in FIG. 24 at a time ta, using the state estimation values obtained by battery model unit 60 at this point in time. As described above, battery information generating unit 70 predicts the input- and output-allowed times for which a predetermined power can be continuously input (charged) or output (discharged) from the present time. The estimation of the input/output-allowed times is executed at predetermined cycles of Tc and, in the example of FIG. 23, at a time tb after Tc from time ta and at a time tc after Tc from time tb, using the state estimation values obtained by battery model unit 60 at the present time.

FIG. 24 is a flowchart illustrating a behavior prediction routine that is periodically executed by battery information generating unit 70. The flowchart shown in FIG. 24 is achieved, as the function of battery information generating unit 70, by executing a program prestored in battery ECU 50 at predetermined cycles (Tc).

Referring to FIG. 24, battery information generating unit 70 obtains the state estimation values at each of points in time where battery model unit 60 successively performs the estimation according to the battery model, in step S300. For example, the state estimation values that handled in step S300 are the SOC, internal temperature, lithium concentration distribution, potential distribution and the like at this point in time. In step S310, battery information generating unit 70 estimates the behavior of the battery output voltage that is exhibited when a predetermined power is continuously charged or discharged from the present time.

Figure 25:
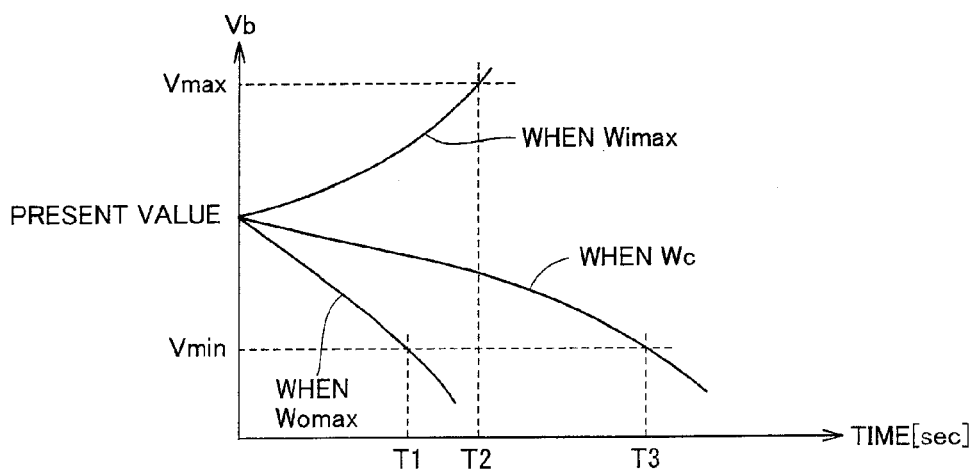
FIG. 25 is a conceptual diagram illustrating a relationship between behavior estimation of a battery output voltage and an input/output-allowed time.

As shown in FIG. 25, calculation according to the model prepared in advance is performed to obtain the predicted value of battery voltage Vb in the case where the charge/discharge is continuously executed from the present time, using maximum output power Womax to the load, maximum input power Wimax from the load and present input/output voltage Wc. This model for estimating the battery voltage behavior may be prepare, e.g., by simplifying the foregoing battery model equations (M1)-(M15) in view of the fact that the input and output powers are constant. Alternatively, function equations other than the above may be defined for estimating the battery behavior (e.g., dVb/dt: a change in battery voltage per unit time) using, as variables, the state estimation values obtained in step S100 and the predetermined charged and discharged powers.

Based on the prediction model for the battery voltage behavior, the operation is performed to obtain the times that elapse before battery voltage Vb reaches a lower limit voltage Vmin (discharge) or reaches an upper limit voltage Vmax (charging) in the cases where secondary battery 10 continuously inputs or outputs the input/output powers Womax (maximum output power: discharge), Wimax (maximum input power: charge) and present input/output power Wc, respectively. Times T1-T3 required for the above reaching are the input/output-allowed times that are predicted when secondary battery 10 continuously receives or supplies powers Womax, Wimax and Wc from the present time. Upper limit voltage Vmax and lower limit voltage Vmin described above are determined according to the maximum rated voltage and minimum rated voltage, or to the operation-allowing (guaranteed) voltage of the load and/or the like.

More specifically, input/output time T1 indicates the maximum time for which maximum output power Womax can be continuously discharged from the present time without lowering battery voltage Vb to lower limit voltage Vmin. Likewise, input/output time T2 indicates the maximum time for which maximum input power Wimax can be continuously charged from the present time without raising battery voltage Vb to upper limit voltage Vmax. Input/output time T3 indicates the maximum time for which charge/discharge of secondary battery 10 with the present input/output power can be continuously performed from the present time while keeping battery voltage Vb within in a range from upper limit voltage Vmax to lower limit voltage Vmin. In this manner, battery information generating unit 70 can estimate the input/output-allowed times with the predetermined input/output powers at respective points in time.

Figure 26:
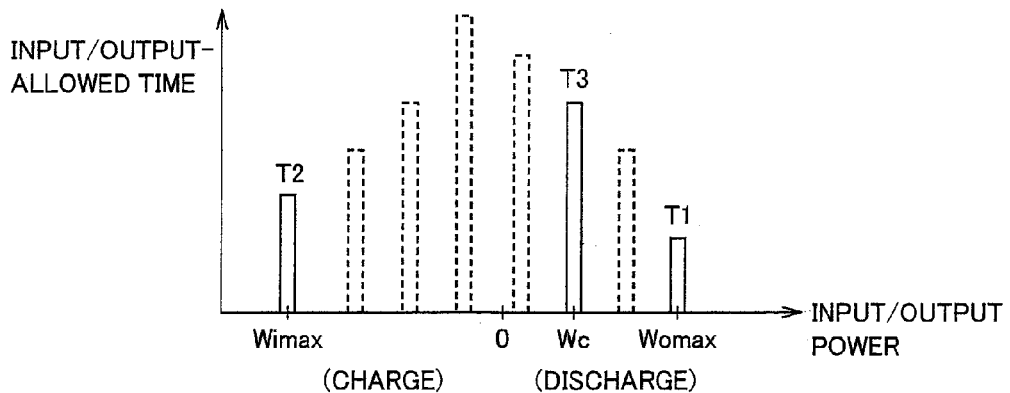
FIG. 26 is a conceptual diagram illustrating a structural example of predicted information used in the charge/discharge control of the secondary battery according to the fourth embodiment.

Particularly, as shown in FIG. 26, the input/output-allowed times can be predicted in connection with the predetermined powers in a plurality of cases using maximum output power Womax, maximum input power Wimax, present input/output power Wc and other predetermined powers, respectively, and thereby the characteristics of input/output power and input/output-allowed time can be obtained in a map form.

Referring to FIG. 24 again, battery information generating unit 70 in step S320 compares the predicted battery voltage behavior with upper and lower limit voltages Vmax and Vmin as shown in FIG. 25, and thereby predict the input/output-allowed time. Battery information generating unit 70 provides the prediction information that represents the characteristics of input/output power and input/output-allowed time, e.g., shown in FIG. 26 as the battery information to control device 80 in step S330.

Control device 80 produces the operation command for load 20 to restrict the charge/discharge of secondary battery 10 to an extent avoiding the overcharge and overdischarge of the secondary battery, in view of the characteristics of input/output power and input/output-allowed time obtained by battery information generating unit 70. Particularly, by using the information indicating the continuous input/output-allowed time with respect to the charge/discharge power without merely using outputtable power (discharge power upper limit) Wout and inputtable power (charge power upper limit) Win of secondary battery 10, it is possible to avoid the overcharge and the overdischarge in the predicting fashion, and it can be expected to achieve the charge/discharge restrictions that can maximize the performance of the battery.

According to the control system of the secondary battery according to the fourth embodiment, as described above, the input/output-allowed time with respect to the predetermined power can be predicted at predetermined cycles, based on the estimation of the battery state according to the battery model equation that allows dynamic estimation of the internal state of the secondary battery. Further, the operation command for load 20 that transfers the power to and from secondary battery 10 is produced by reflecting the above behavior prediction. Therefore, the charge/discharge restriction that avoids the overcharge and overdischarge of secondary battery 10 can be performed.

Further, the input/output-allowed times with respect to the input/output powers in multiple stages are predicted and reflected in the operation command for load 20. Thereby, the charge/discharge restriction can be executed in a stepwise fashion, in contrast to the control structure of merely setting only the upper limit of the charge/discharge power, and the secondary battery can be used in the manner that takes out the battery performance to the maximum extent while avoiding the overcharge and overdischarge.

First Modification of Fourth Embodiment

A first modification of the fourth embodiment will now be described in connection with a structure in which a behavior estimating unit according to the battery information generating unit evaluates the degree of deterioration with respect to the charge/discharge condition (input/output power) at the present time, and thereby the charge/discharge of the secondary battery is restricted.

Figure 27:
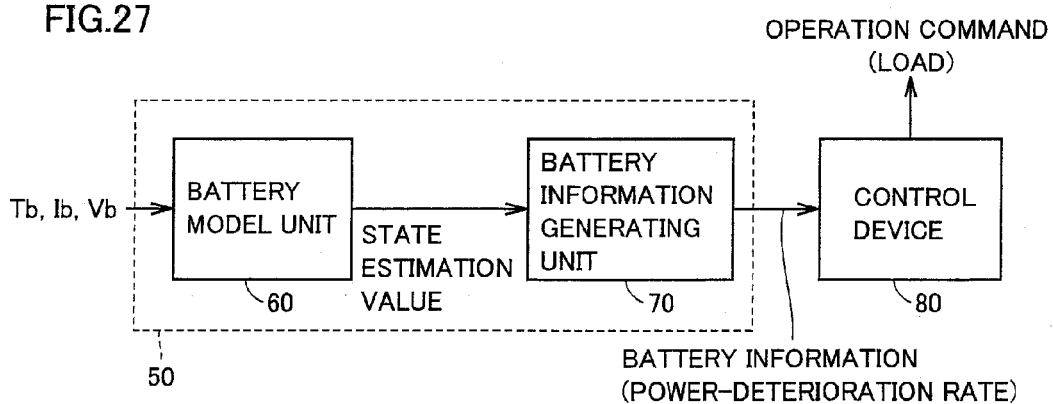
FIG. 27 is a schematic block diagram illustrating a functional structure of a battery ECU according to a first modification of the fourth embodiment.

FIG. 27 is a schematic block diagram illustrating a functional structure of a battery ECU according to a first modification of the fourth embodiment.

Referring to FIG. 27, battery ECU 50 includes battery model unit 60 and battery information generating unit 70, similarly to that shown in FIG. 22 (fourth embodiment). Battery model unit 60 dynamically estimates the internal state of secondary battery 10, and successively updates the state estimation values as already described in connection with the first embodiment.

In the first modification of the fourth embodiment, battery information generating unit 70 performs predetermined prediction arithmetic using the state estimation values calculated by battery model unit 60, and thereby evaluates a deterioration rate in the case where secondary battery 10 is continuously charged/discharged with a predetermined power. Battery information generating unit 70 provides the prediction information indicating characteristics of input/output power and deterioration rate, and provides it as the battery information to control device 80. Control device 80 produces the operation command for load 20 in view of the battery information (the prediction information about the characteristics of input/output power and deterioration rate) provided from battery information generating unit 70. The deterioration rate is a parameter indicating a degree of progress of the battery deterioration per unit time, and increases when the battery is liable to deteriorate to a higher extent.

Figure 28:
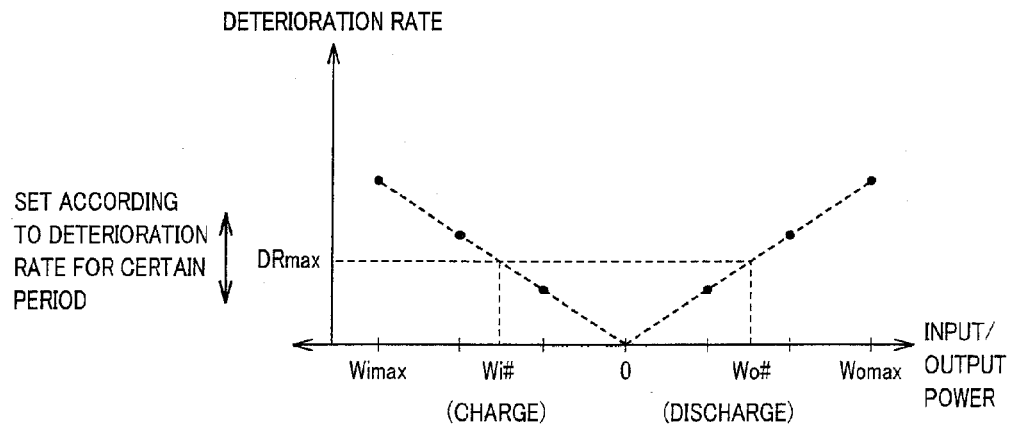
FIG. 28 is a conceptual diagram showing charge/discharge restrictions and a structural example of predicted information used in the charge/discharge control of the secondary battery according to the first modification of the fourth embodiment.

For example, as shown in FIG. 28, battery information generating unit 70 obtains predicted deterioration rates in the respective cases where a plurality of predetermined powers in a range between maximum output power Womax and maximum input power Wimax are input/output in the present battery state. The model equation for predicting the deterioration rate is set by reflecting at least battery temperature T and input/output power Ib among the state estimation values that are obtained by battery model unit at that point in time. Since this model equation can be set arbitrarily, the details thereof will not be described.

Battery information generating unit 70 executes the behavior prediction routine (not shown) for obtaining the above prediction information (the characteristics of input/output power-deterioration rate) at predetermined cycles.

Figure 29:
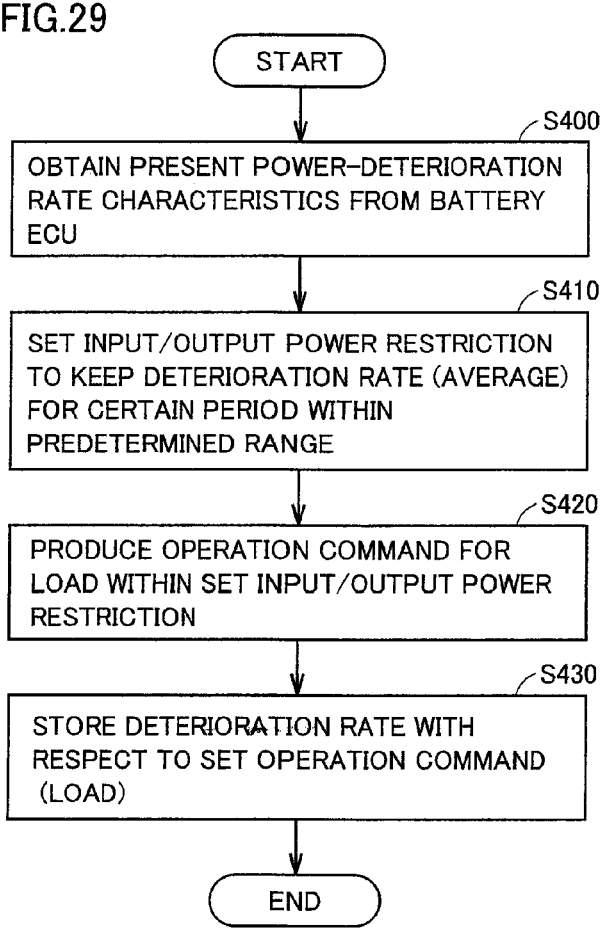
FIG. 29 is a flowchart illustrating the charge/discharge control of the secondary battery according to the first modification of the fourth embodiment.

FIG. 29 is a flowchart illustrating the charge/discharge control of secondary battery 10 according to the first modification of the fourth embodiment. The charge/discharge control in the first modification of the fourth embodiment is primarily aimed at production of the operation command issued by control device 80 and reflecting the deterioration rate estimation by battery ECU 50 (battery information generating unit 70).

Referring to FIG. 29, control device 80 obtains, as the battery information, the characteristics of charge/discharge condition (input/output power) and estimated deterioration rate at the present time from battery ECU 50 in step S400. Control device 80 determines an upper limit deterioration rate DRmax that is allowed at the present time, so that an integration value or an average value of the deterioration rate within a certain period may fall within a predetermined range in step S410. For example, when the battery has continued the operation in a condition exhibiting a large deterioration rate, upper limit deterioration rate DRmax is set to a relatively small value for restricting rapid progress of the battery deterioration. Control device 80 performs the charge/discharge restrictions according to calculated upper limit deterioration rate DRmax.

Referring again to FIG. 28, according to calculated upper limit deterioration rate DRmax as well as the characteristics of input/output voltage and predicted deterioration rate obtained by battery information generating unit 70, the operation is performed to obtain an upper limit output power Wo# and an upper limit input power Wi# exhibited when the deterioration rate predicted based on the present battery state attains upper limit deterioration rate DRmax.

Referring again to FIG. 29, control device 80 produces the operation command for load 20 in step S420 by performing the charge/discharge restrictions that keep the power within the input/output power range set in step S410, and thus the charge/discharge restrictions that use Wi# and Wo# as the upper limits for the charge and the discharge, respectively. In step S430, control device 80 obtains, based on the predicted information shown in FIG. 28, the predicted deterioration rate corresponding to the operation command for load 20 set in step S420, and stores it. This operation updates the evaluation of the deterioration rate (integration value or average value) for a certain period in the next arithmetic operation.

Owing to this structure, the control system of the secondary battery according to the first modification of the fourth embodiment successively predict the degree of deterioration with respect to the used power (input/output power) at each point in time based on the internal state estimation of the secondary battery according to the battery model, and thereby can execute the charge/discharge control restricting a range so that the deterioration of secondary battery 10 may not progress remarkably.

The fourth embodiment and the first modification may be combined to provide a structure in which prediction relating to both the input/output-allowed time and the deterioration rate with respect to the input/output power is handled as battery information, and is provided from battery ECU 50 to control device 80 for performing the charge/discharge control of secondary battery 10. In this case, control device 80 produces the operation command for load 20 in view of both the input/output-allowed time and the deterioration rate so that the overcharge and overdischarge of secondary battery 10 as well as the rapid progression of deterioration can be avoided.

Second Modification of the Fourth Embodiment

Figure 30:
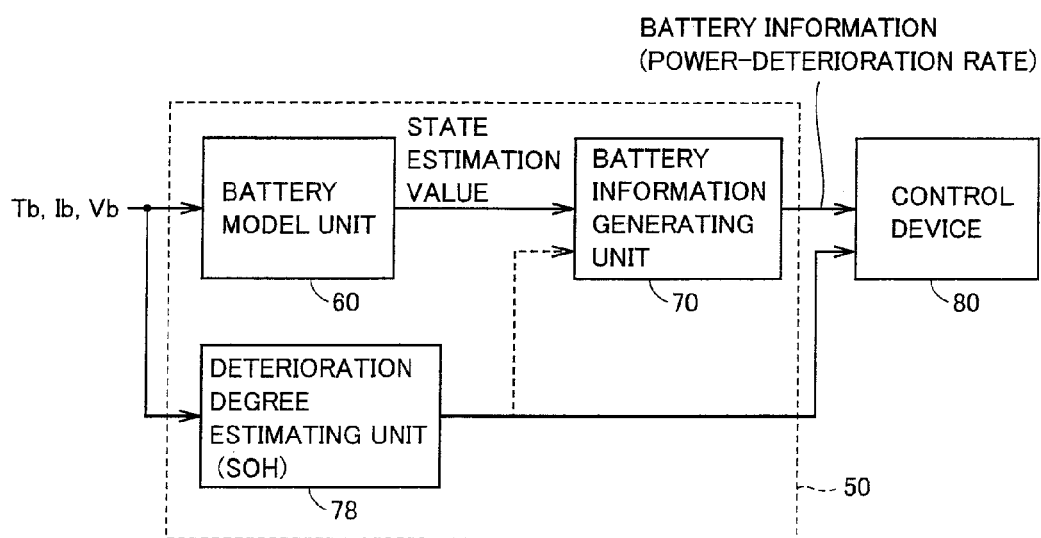
FIG. 30 is a schematic block diagram illustrating a functional structure of the charge/discharge control of the secondary battery according to a second modification of the fourth embodiment.

FIG. 30 is a block diagram illustrating a functional structure of the charge/discharge control of the secondary battery according to a second modification of the fourth embodiment.

Referring to FIG. 30, battery ECU 50 in the second modification of the fourth embodiment further includes a deterioration degree estimating unit 78 in addition to battery model unit 60 and battery information generating unit 70 similar to those in FIG. 27.

Deterioration degree estimating unit 78 has a function of estimating a so-called SOH (State Of Health) of the battery, and estimates the degree of deterioration and/or the remaining life of secondary battery 10 based on values Tp, Ib and Vb sensed by sensors 30, 32, 34. The degree of deterioration and/or the remaining life of secondary battery 10 estimated by deterioration degree estimating unit 78 is provided to control device 80 and may be also provided to a battery information generating unit 70#. For example, deterioration degree estimating unit 78 can estimate the degree of deterioration and/or the remaining life of secondary battery 10 at that point in time by the manner already described in connection with the second embodiment (particularly, FIG. 18).

Figure 31:
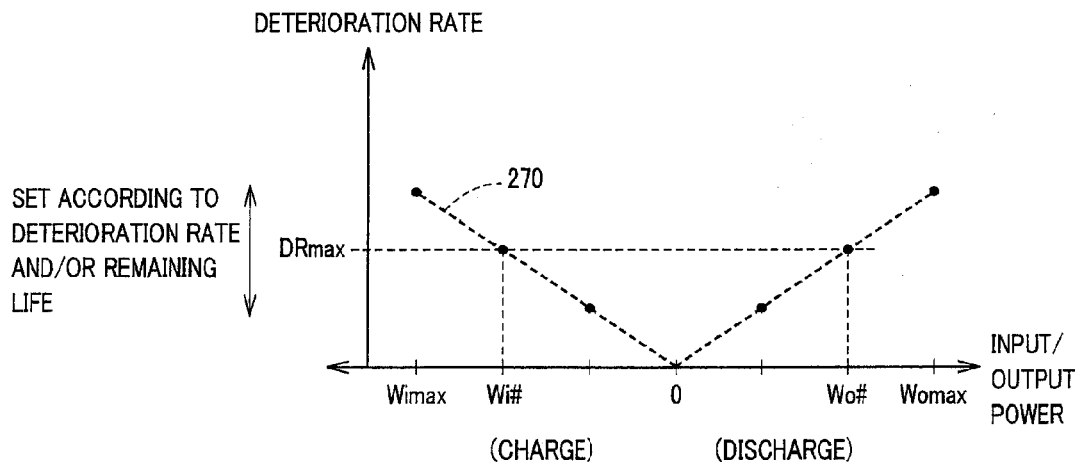
FIG. 31 is a conceptual diagram showing charge/discharge restrictions and a structural example of the predicted information used in the charge/discharge control of the secondary battery according to the second modification of the fourth embodiment.

FIG. 31 is a conceptual diagram showing a structural example of the predicted information used in the charge/discharge control of the secondary battery according to the second modification of the fourth embodiment as well as the charge/discharge restriction.

Referring to FIG. 31 battery information generating unit 70 predicts the deterioration rate of secondary battery 10 with respect to the input/output power, based on the internal state of the secondary battery at this point in time, as similar shown in FIG. 28, and provides the predicted information about the characteristics of input/output power and deterioration rate to control device 80 as the battery information.

Control device 80 sets upper limit deterioration rate DRmax allowed at the present time according to the deterioration degree and/or the remaining life estimated by deterioration degree estimating unit 78. For example, upper limit deterioration rate DRmax is set to a lower value as the deterioration degree increases or the remaining life decreases.

In this manner, upper limit output power Wo# and upper limit input power Wi# in the state where the deterioration rate reaches upper limit deterioration rate DRmax are obtained based on the predicted information (dotted line 270 in FIG. 31) obtained by battery information generating unit 70. Control device 80 produces the operation command for load 20, restricting the power within the range where Wi# is the upper limit for the charging and Wo# is the upper limit for the discharging.

Figure 32:
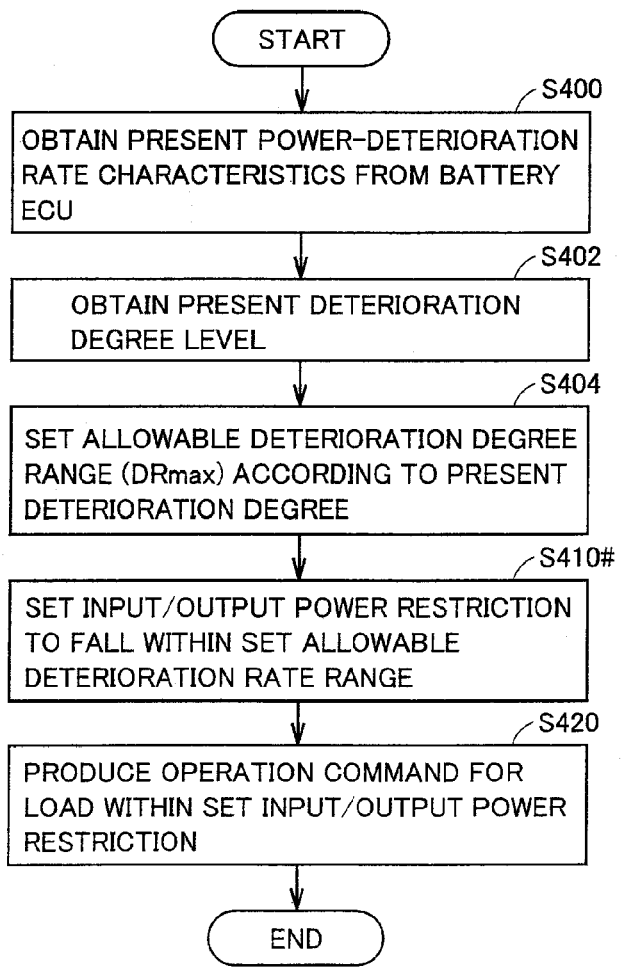
FIG. 32 is a flowchart illustrating the charge/discharge control of the secondary battery according to the second modification of the fourth embodiment.

FIG. 32 is a flowchart illustrating the charge/discharge control of the secondary battery according to the second modification of the fourth embodiment.

Referring to FIG. 32, control device 80 obtains, as the battery information, the characteristics of charge/discharge condition (input/output power) and predicted deterioration rate at the present time provided from battery ECU 50 in step S400. In step S402, control device 80 obtains the deterioration degree and/or the remaining life estimated by deterioration degree estimating unit 78, and further sets the allowable deterioration rate range (i.e., upper limit deterioration rate DRmax) according to the present deterioration rate and/or the remaining life in step S404.

In step S410#, control device 80 sets the input/output power restrictions according to the allowable deterioration rate range set in step S404. More specifically, as shown in FIG. 31, control device 80 obtains upper limit output power Wo# and upper limit input power Wi# set in the case where the deterioration rate predicted based on the present battery state reaches upper limit deterioration rate DRmax, according to upper limit deterioration rate DRmax set based on the present deterioration degree and/or the remaining life as well as the characteristics of input/output power and prediction deterioration rate provided by battery information generating unit 70. Battery information generating unit 70 may execute the above setting of the input/output power restrictions, may prepare the prediction information containing upper limit output power Wo# and upper limit input power Wi#, and may successively provide it to control device 80.

In step S420, control device 80 produces the operation command for load 20 while restricting the power within the input/output power range set in step S410#, i.e., while performing the charge/discharge restrictions that use Wi# and Wo# as the upper limits for the charging and discharging, respectively.

Owing to the above structure, the control system of the secondary battery according to the second modification of the fourth embodiment can achieve the same effect as that by the first modification of the fourth embodiment, and additionally can set the deterioration rate allowed in each point in time according to the predicted deterioration degree and/or estimated remaining life. Thereby, the charge/discharge restriction range can be appropriately set according to the state of health at that point in time. Thereby, the charge/discharge restriction range can be appropriately set according to the state of health of the secondary battery so that it is possible to prevent rapid deterioration of the secondary battery and thereby to increase the life.

The fourth embodiment and the second modification may be combined to provide a structure in which both the input/output-allowed time and the deterioration rate with respect to the input/output power are handled as predicted information, and the charge/discharge control of secondary battery 10 is performed in view of the predicted deterioration degree and/or the estimated remaining life. In this case, in view of the input/output-allowed time as well as both the deterioration degree and the deterioration rate, control device 80 likewise produces the operation command for load 20 such that the system can avoid reduction in battery life due to the overcharge and overdischarge of secondary battery 10 as well as the rapid progress of deterioration.

Fifth Embodiment

A fifth embodiment will now be described in connection with application of the control system of the secondary battery according to the first to fourth embodiments and the modifications thereof to a hybrid vehicle.

Figure 33:
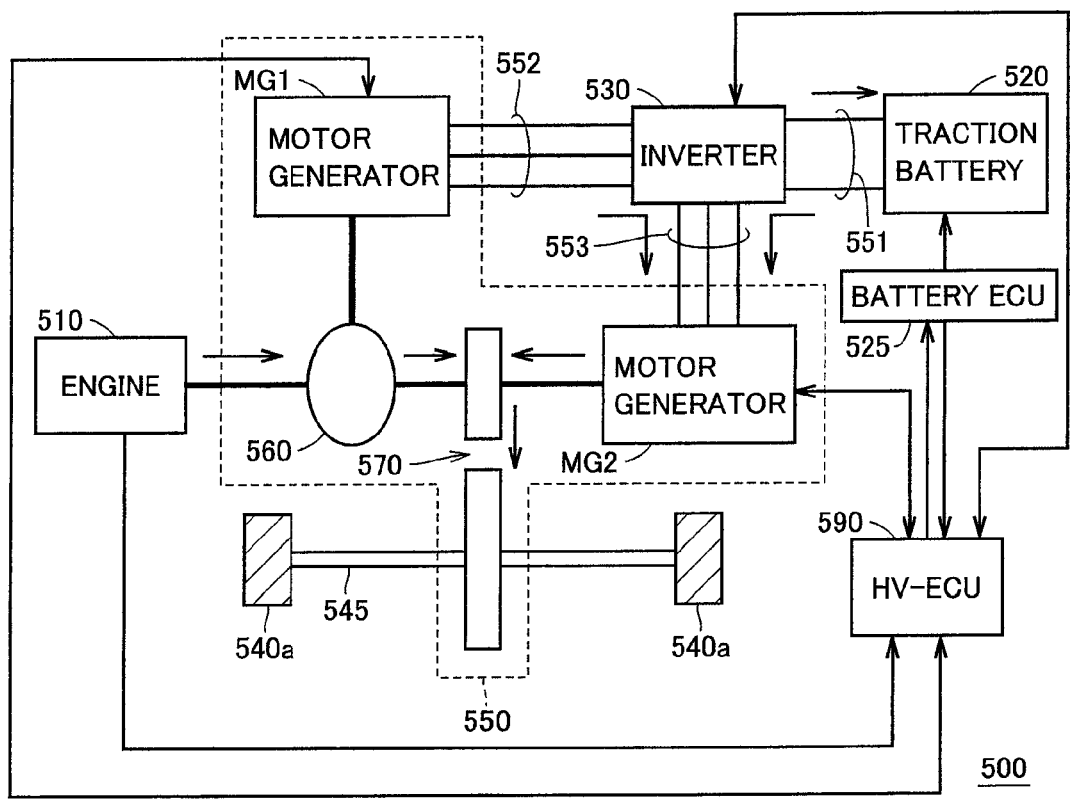
FIG. 33 is a block diagram illustrating a structural example of a hybrid vehicle according to a fifth embodiment of the invention.

FIG. 33 is a block diagram illustrating a structural example of a hybrid vehicle according to the fifth embodiment of the invention.

Referring to FIG. 33, a hybrid vehicle 500 includes an engine 510, a traction battery 520, a battery ECU 525, an inverter 530, wheels 540*a*, a trans-axle 550 and an electronic control unit (HV-ECU) 590 controlling the overall operations of hybrid vehicle 500.

In hybrid vehicle 500 shown in FIG. 33, traction battery 520 and battery ECU 525 correspond to secondary battery 10 and battery ECU 50 (FIG. 1) in the first to fourth embodiments and the modifications thereof. Thus, battery ECU 525 corresponds to the "charge/discharge control device" in the hybrid vehicle according to the invention. HV-ECU 590 corresponds to control device 80 (FIG. 1) in the first to fourth embodiments and the modifications thereof.

Motor generators MG1 and MG2 correspond to load 20 (FIG. 1) in the first to fourth embodiments and the modifications thereof. Motor generator MG2 for generating the vehicle driving power primarily forms the load that performs input/output of the electric power with respect to traction battery 520.

Engine 510 generates the drive power using a combustion energy of fuel such as gasoline as a power source. Traction battery 520 supplies a DC power to a power line 551. Traction battery 520 is typically formed of a lithium ion secondary battery, of which charge and discharge are controlled by the control system of the secondary battery according to the embodiment of the invention.

Inverter 530 converts the DC power supplied from traction battery 520 into an AC power, and provides it to a power line 553. Also, inverter 530 converts the AC power supplied to power lines 552 and 553 into a DC power, and provides it to power line 551.

Trans-axle 550 includes a transmission and an axle as an integrated structure, and has a power splitting mechanism 560, a speed reducer 570 and motor generators MG1 and MG2. Power splitting mechanism 560 can split the drive power generated by engine 510 into a path for transmission to a drive shaft 545 for driving wheels 540*a* via speed reducer 570 and a transmission path to motor generator MG1.

Motor generator MG1 is rotated to generate an electric power by a drive power transmitted from engine 510 through power splitting mechanism 560. The electric power generated by motor generator MG1 is supplied to inverter 530 via power line 552, and is used as a charge power of traction battery 520 or a drive power of motor generator MG2.

Motor generator MG2 is driven to rotate by the AC power supplied from inverter 530 to power line 553. The drive power generated by motor generator MG2 is transmitted to drive shaft 545 via speed reducer 570. When motor generator MG2 is rotated during the speed reduction of wheels 540*a* in a regenerative braking operation, the electromotive force (AC power) generated in motor generator MG2 is supplied to power line 553. In this case, inverter 530 converts the AC power supplied to power line 553 into a DC power, and provides it to power line 551 so that traction battery 520 is charged.

Each of motor generators MG1 and MG2 can function as an electric power generator and an electric motor. However, motor generator MG1 often operates substantially as the electric power generator, and motor generator MG2 often operates primarily as the electric motor. HV-ECU 590 controls the overall operations of the device and circuit groups mounted on the vehicle for driving hybrid vehicle 500 according to the driver's commands.

As described above, hybrid vehicle 500 combines the drive power generated by engine 510 and the drive power generated by motor generator MG2 that uses the electric energy of traction battery 520 as the source, and thereby it is driven with improved fuel consumption.

For example, in a low-load operation such as starting, slow-speed running or descending on a gentle slope, hybrid vehicle 500 is basically driven only by the drive power provided by motor generator MG2 without operating the engine so that the operation in a region of low engine efficiency may be avoided.

In the ordinary running operation, power splitting mechanism 560 splits the drive power provided from engine 510 into the drive power for wheels 540*a* and the drive power for electric power generation by motor generator MG1. The power generated by motor generator MG1 is used for driving motor generator MG2. In the ordinary running, the drive power produced by motor generator MG2 assists the drive power produced by engine 510 for driving wheels 540*a*. ECU 590 controls the rate of drive power sharing between engine 510 and motor generator MG2.

In a fully accelerating operation, the electric power supplied from traction battery 520 is further used for driving motor generator MG2 so that the drive power of wheels 540*a* can be further increased.

In the decelerating and braking operations, motor generator MG2 generates a torque in a direction opposite to that of the rotation of wheel 540*a*, and thereby operates as an electric power generator performing the regenerative power generation. The electric power recovered by the regenerative power generation of motor generator MG2 is used for charging traction battery 520 through power line 553, inverter 530 and power line 551. Further, engine 510 automatically stops when the vehicle stops.

As described above, the overall drive power required in the vehicle is shared between engine 510 and motor generator MG2 in the manner according to the drive situation. More specifically, HV-ECU 590 determines the above sharing according to the drive situation in view of the fuel consumption efficiency of engine 510.

Figure 34:
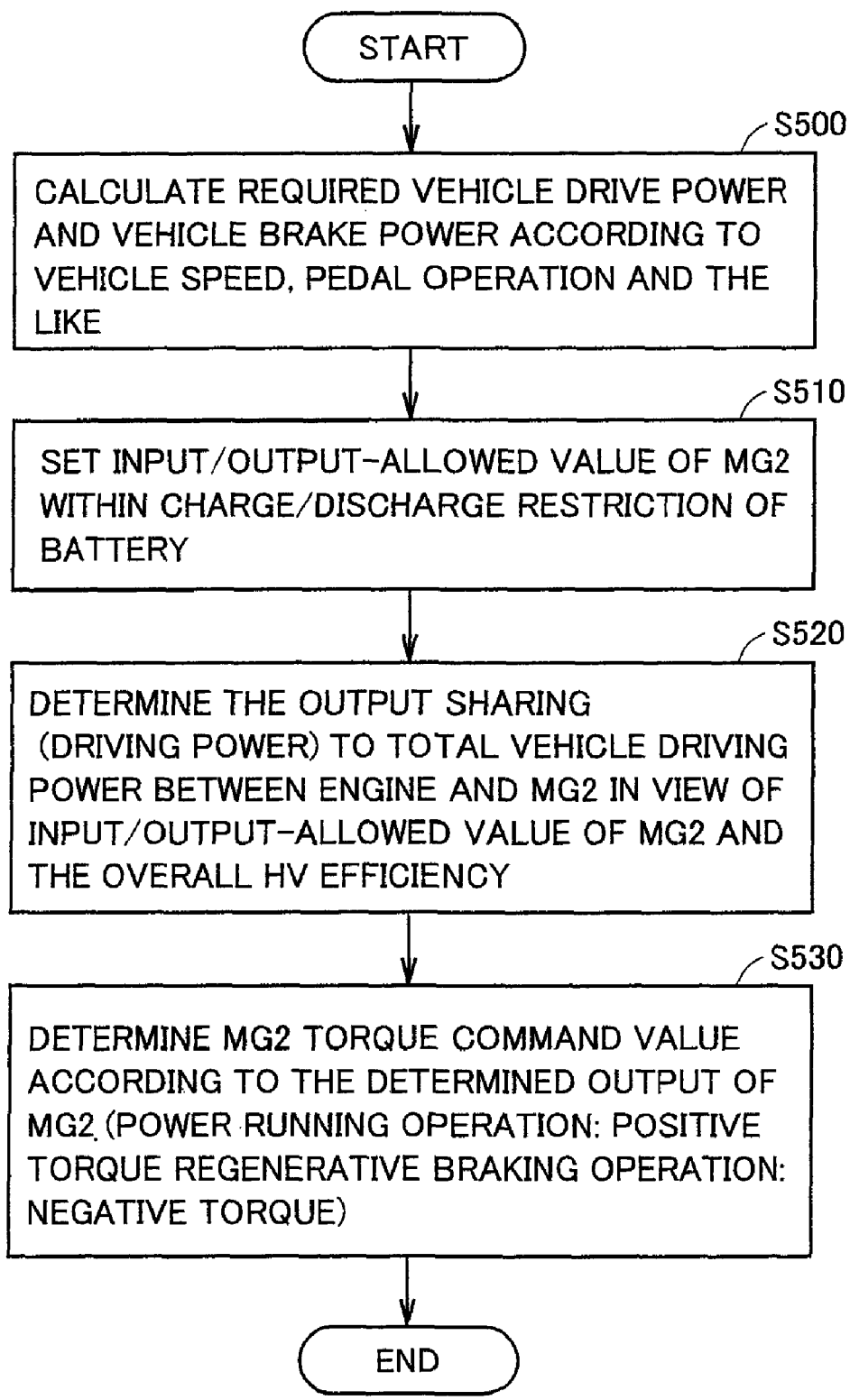
FIG. 34 is a flowchart illustrating operation command value setting of a motor generator MG2 in a hybrid vehicle equipped with the control system of the secondary battery according to the embodiment.

FIG. 34 is a flowchart that illustrates setting of the operation command value of motor generator MG2 in hybrid vehicle 500 equipped with the control system of the secondary battery according to the embodiment. The flowchart shown in FIG. 34 is implemented by executing a program prestored in HV-ECU 590 at predetermined cycles.

Referring to FIG. 34, HV-ECU 590 calculates the vehicle drive power and the vehicle brake power required in the whole vehicle according to the present vehicle speed, pedal operations by a driver and others in step S500.

HV-ECU 590 sets the input/output-allowed value (electric power) of motor generator MG2 corresponding to the charge/discharge restriction of traction battery 520 (secondary battery 10) that is set according to the first to fourth embodiments and the modifications in step S510.

HV-ECU 590 further determines the output sharing of the drive power between engine 510 and motor generator MG2 in view of the input/output-allowed value set in step S510 and the overall efficiency of hybrid vehicle 500, and specifically in view of achieving the drive region of high efficiency for engine 510 (step S520). This avoids the operation of motor generator MG2 that causes the overcharge and the overdischarge of traction battery 520, and specifically avoids a power running operation generating a vehicle drive power, or a regenerative braking operation for electric power generation).

In step S530, HV-ECU 590 determines the torque command value of motor generator MG2 according to the output of motor generator MG2 determined in step S520. The torque command value of motor generator MG2 is generally set to a positive torque during the power running operation generating the vehicle drive power, and is set to a negative torque during the regenerative braking operation generating the vehicle driving power.

Hybrid vehicle 500 is provided with a hydraulic brake (not shown) for the axle including drive wheel 540*a*, and is controlled to ensure the overall braking force that is required in the vehicle, is calculated in step S500 and is equal to a sum of the braking force generated by the hydraulic brake and the braking force generated by motor generator MG2 and associated with the regenerative braking electric power generation. Therefore, even when the charge control is difficult and the regenerative power generation by motor generator MG2 is not allowed, the hydraulic brake (not shown) ensures the overall braking force of the vehicle. Meanwhile, motor generator MG2 performs the regenerative braking operation within a range of the charge restriction of traction battery 520 so that the electric power can be effectively collected.

A part of the foregoing function of HV-ECU 590 that is achieved by the processing in steps S500-S530 shown in FIG. 34 corresponds to the "control device" according to the invention.

When the hybrid vehicle is equipped with the control system of the secondary battery according to the first to fourth embodiments and the modifications, motor generator MG2 for generating the vehicle drive power can be operated by performing the charge/discharge control which is configured to exhibit fully the battery performance and to avoid the overcharge, overdischarge and rapid progress of the deterioration even in traction battery 520 used by repeating the charging and discharging operations.

The description of the fifth embodiment has been given on the example of application to the series/parallel-type hybrid system that can split the power of the engine for transmission to the axle (drive shaft) and the generator by the power splitting mechanism, and has also been given in view of the output sharing of the vehicle drive power between the engine and the motor. However, the application of the invention is not restricted to the above cases, and the charge/discharge control of the secondary battery according to the invention that is achieved by the operation command production for the load based the behavior prediction can be applied to various devices, systems and the like without particularly restricting the load.

Also, the invention can also be applied to only the discharge restriction or the charge restriction, e.g., of such a configuration that performs only the electric power supply (discharge) from the secondary battery to the load or only the electric power supply (charge) from the load to the secondary battery.

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The control system of the secondary battery according to the invention can be typically applied to the charge/discharge control of the secondary battery (e.g., lithium ion battery) mounted on the electric vehicle or the hybrid vehicle.

The invention claimed is:

1. A control system of a secondary battery being capable of supplying and receiving an electric power to and from a load, wherein said secondary battery includes:

first and second electrodes including an active material having a predetermined material present in a solid state, and an ion conductor arranged between said first and second electrodes for transmitting said predetermined material in an ionized form between said electrodes; and said control system comprises:

a battery state estimating unit successively calculating a state estimation value indicating a battery state according to a battery model allowing dynamic estimation of the internal state of said secondary battery based on a value sensed by a sensor arranged at said secondary battery, a battery information generating unit producing battery information for restricting charge/discharge of said secondary battery based on said state estimation value calculated by said battery state estimating unit, and a load control unit for producing an operation command for said load to avoid overcharge and overdischarge of said secondary battery in view of said battery information produced by said battery information generating unit based on an operation request to said load; and said battery state estimating unit includes:

a first model unit for estimating an electrochemical reaction of said predetermined material at an interface between said active material and said ion conductor in each of said electrodes, a second model unit for estimating a concentration distribution of said predetermined material in each of said electrodes based on a diffusion equation, a third model unit for estimating an ion concentration distribution of said predetermined material in said ion conductor based on a diffusion equation, a fourth model unit for estimating a potential distribution according to a current distribution caused in each of said electrodes and said ion conductor by a reaction current according to said electrochemical reaction, and a boundary condition setting unit for setting a boundary condition at said interface of said diffusion equation used in said second model unit based on a predetermined relational expression between a time differentiation of a concentration of said predetermined material and said reaction current.

2. The control system of the secondary battery according to claim 1, wherein said predetermined relational expression is expressed by the following equation:

$$\frac{\delta(\varepsilon_s c_s)}{\delta t} = -\frac{j^{Li}}{a_s F} \quad (r = r_s)$$

wherein "$c_s$" indicates a concentration of said predetermined material at each of points in said active material represented by a spherical model determined by assuming that the concentration of said predetermined material is uniform in a circumferential direction, r indicates a distance to each of said points from a center of said active material, $r_s$ indicates a radius of said active material, $\varepsilon_s$ indicates a volume fraction of said active material, t indicates a time, $j^{Li}$ indicates said reaction current, $a_s$ indicates a surface area of said active material and F indicates a Faraday constant.

3. The control system of the secondary battery according to claim 1, wherein said battery information includes an upper limit power being inputtable and outputtable from said secondary battery, said battery information generating unit sets said upper limit power based on a distribution of said state estimation values at respective portions in said secondary battery, and said load control unit produces the operation command for said load within a range equal to or lower than said upper limit power set by said battery information generating unit.

4. The control system of the secondary battery according to claim 1, further comprising:

a parameter identification model unit identifying a parameter used in said battery model based on a sensed value sensed by said sensor; and a parameter managing unit updating a parameter value used in said battery model of the parameter identified by said parameter identification model unit to a value identified by said parameter identification model unit when a difference larger than a predetermined value is present between the sensed value sensed by said sensor and representing an actual behavior of said secondary battery and a predicted value of said behavior based on a predicted value provided by said battery state estimating unit.

5. The control system of the secondary battery according to claim 4, wherein when said parameter value is to be updated, said parameter managing unit estimates deterioration of said secondary battery by comparing the parameter value to be updated with characteristics of deterioration of said parameter value due to use of said secondary battery.

6. The control system of the secondary battery according to claim 1, wherein said battery information generating unit predicts, as said battery information, an input/output allowed time for which said secondary battery can continuously input/output a predetermined power from a present time, based on said state estimation value at the present time estimated by said battery state estimating unit, and said load control unit produces an operation command for said load to avoid overcharge and overdischarge of said secondary battery in view of the input/output-allowed time predicted as said battery information.

7. The control system of the secondary battery according to claim 1, wherein said battery information generating unit predicts, as said battery information, a deterioration rate of said secondary battery attained in the case where said secondary battery continuously inputs/outputs a predetermined power from a present time, based on said state estimation value at the present time estimated by said battery state estimating unit, and said load control unit produces an operation command for said load in view of the deterioration rate predicted as said battery information.

8. The control system of the secondary battery according to claim 7, further comprising:
a deterioration degree estimating unit estimating a deterioration degree or a remaining life of said secondary battery based on a sensed value of said sensor, wherein
said load control unit produces the operation command for said load by obtaining an allowed deterioration rate range at a present time and restricting a charge/discharge power range of said secondary battery such that the deterioration rate predicted as said battery information falls within the allowed deterioration rate range, in view of said deterioration rate or said remaining life estimated by said deterioration degree estimating unit.

9. The control system of the secondary battery according to claim 1, wherein
said secondary battery is formed of a lithium ion battery, and
said predetermined material is lithium.

10. A hybrid vehicle comprising:
an internal combustion engine and an electric motor configured to generate a drive power of the vehicle;
a control device determining drive powers to be output from said internal combustion engine and said electric motor, respectively, to ensure a required overall drive power of said vehicle;
a secondary battery being capable of supplying and receiving the electric power to and from said electric motor; and
a charge/discharge control device of said secondary battery,
said secondary battery including:
first and second electrodes including an active material having a predetermined material present in a solid state, and
an ion conductor arranged between said first and second electrodes for transmitting said active material in an ionized form between said electrodes;
said charge/discharge control system includes:
a battery state estimating unit successively calculating a state estimation value indicating a battery state according to a battery model allowing dynamic estimation of the internal state of said secondary battery based on a value sensed by a sensors arranged at said secondary battery, and
a battery information generating unit producing battery information for restricting charge/discharge of said secondary battery based on said state estimation value calculated by said battery state estimating unit;
said battery state estimating unit has:
a first model unit for estimating an electrochemical reaction of said predetermined material at an interface between said active material and the ion conductor in each of said electrodes,
a second model unit for estimating a concentration distribution of said predetermined material in each of said electrodes based on a diffusion equation,
a third model unit for estimating an ion concentration distribution of said predetermined material in said ion conductor based on a diffusion equation,
a fourth model unit for estimating a potential distribution according to a current distribution caused in each of said electrodes and said ion conductor by a reaction current according to said electrochemical reaction, and
a boundary condition setting unit for setting a boundary condition at said interface of said diffusion equation used in said second model unit based on a predetermined relational expression between a time differentiation of a concentration of said predetermined material and said reaction current; and
said control device produces an torque command value for said electric motor to avoid overcharge and overdischarge of said secondary battery in view of said battery information produced by said battery information generating unit.

11. The hybrid vehicle according to claim 10, wherein
said predetermined relational expression is expressed by the following equation:

$$\frac{\delta(\varepsilon_s c_s)}{\delta t} = -\frac{j^{Li}}{a_s F} \quad (r = r_s)$$

wherein "$c_s$" indicates a concentration of said predetermined material at each of points in said active material represented by a spherical model determined by assuming that the concentration of said predetermined material is uniform in a circumferential direction, r indicates a distance to each of said points from a center of said active material, $r_s$ indicates a radius of said active material, $\varepsilon_s$ indicates a volume fraction of said active material, t indicates a time, $j^{Li}$ indicates said reaction current, $a_s$ indicates a surface area of said active material and F indicates a Faraday constant.

12. The hybrid vehicle according to claim 10, wherein
said battery information includes an upper limit power being inputtable and outputtable from said secondary battery,
said battery information generating unit sets said upper limit power based on a distribution of said state estimation values at respective portions in said secondary battery, and
said control device produces the torque command value for said electric motor within a range equal to or lower than said upper limit power set by said battery information generating unit.

13. The hybrid vehicle according to claim 10, wherein
said charge/discharge control device further includes:
a parameter identification model unit identifying a parameter used in said battery model based on a sensed value sensed by said sensor; and
a parameter managing unit updating a parameter value used in said battery model of the parameter identified by said parameter identification model unit to a value identified by said parameter identification model unit when a difference larger than a predetermined value is present between the sensed value sensed by said sensor and representing an actual behavior of said secondary battery and a predicted value of said behavior based on a predicted value provided by said battery state estimating unit.

14. The hybrid vehicle according to claim 13, wherein
when said parameter value is to be updated, said parameter managing unit estimates deterioration of said secondary battery by comparing the parameter value to be updated with characteristics of deterioration of said parameter value due to use of said secondary battery.

15. The hybrid vehicle according to claim 10, wherein
said battery information generating unit predicts, as said battery information, an input/output allowed time for which said secondary battery can continuously input/output a predetermined power from a present time, based on said state estimation value at the present time estimated by said battery state estimating unit, and said control device produces an operation command for said load to avoid overcharge and overdischarge of said secondary battery in view of the input/output-allowed time predicted as said battery information.

16. The hybrid vehicle according to claim 10, wherein
said battery information generating unit predicts, as said battery information, a deterioration rate of said secondary battery attained in the case where said secondary battery continuously inputs/outputs a predetermined power from a present time, based on said state estimation value at the present time estimated by said battery state estimating unit, and
said control device produces an operation command for said load in view of the deterioration rate predicted as said battery information.

17. The hybrid vehicle according to claim 16, wherein
said charge/discharge control device further includes a deterioration degree estimating unit estimating a deterioration degree or a remaining life of said secondary battery based on a sensed value of said sensor, and
said control device produces the torque command value for said electric motor by obtaining an allowed deterioration rate range at a present time and restricting a charge/discharge power range of said secondary battery such that the deterioration rate predicted as said battery information falls within the allowed deterioration rate range, in view of said deterioration rate or said remaining life estimated by said deterioration degree estimating unit.

18. The hybrid vehicle according to claim 10, wherein
said secondary battery is formed of a lithium ion battery, and
said predetermined material is lithium.

* * * * *

UNITED STATES PATENT AND TRADEMARK OFFICE
CERTIFICATE OF CORRECTION

PATENT NO.      : 8,018,203 B2
APPLICATION NO. : 12/375956
DATED           : September 13, 2011
INVENTOR(S)     : Yuji Nishi et al.

It is certified that error appears in the above-identified patent and that said Letters Patent is hereby corrected as shown below:

| Column | Line |  |
|---|---|---|
| 11 | 53-55 | In equation (M1) change "/$i_n$" to -- /$i_{nj}$ --. |
| 11 | 56 | In equation (M2) change "/$i_nR_j$" to -- /$i_{nj}Rj$ --. |
| 12 | 10 | In equation (M6) change "/$i_n$" to -- /$i_{nj}$ --. |
| 13 | 7-10 | In equation (M15) change "$q=a_s/i_n$" to -- $q=a_s/i_{nj}$ --. |
| 14 | 34 | After "slowly" change "that" to -- than --. |
| 15 | 23 | Change "value 11" to -- value l1 --. |
| 15 | 27 | Change "value 12" to -- value l2 --. |
| 15 | 39 | Change "11 and 12" to -- l1 and l2 --. |
| 15 | 42 | Change "value 12" to -- value l2 --. |
| 15 | 56 | Change "value 13" to -- value l3 --. |
| 15 | 67 | Change "values 13 and 14" to -- values l3 and l4 --. |
| 16 | 4 | Change "value 14" to -- value l4 --. |
| 17 | 60 | Change "V3<Vb#21 V4)," to -- V3<Vb#<V4), --. |
| 23 | 50 | After "within" delete "in". |

Signed and Sealed this
Twenty-fourth Day of April, 2012

David J. Kappos
*Director of the United States Patent and Trademark Office*

| 33 | 44 | Change "a sensors" to -- a sensor --. |
| 34 | 4 | Change "an torque" to -- a torque --. |